(12) United States Patent
Nam et al.

(10) Patent No.: US 12,745,225 B2
(45) Date of Patent: Sep. 22, 2026

(54) METHOD AND APPARATUS TO SUPPORT MULTIPLE NUMEROLOGIES IN WIRELESS COMMUNICATION SYSTEMS

(71) Applicant: Samsung Electronics Co., Ltd., Suwon-si (KR)

(72) Inventors: Young Han Nam, Plano, TX (US); Jinyoung Oh, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 18/491,651

(22) Filed: Oct. 20, 2023

(65) Prior Publication Data

US 2024/0172197 A1 May 23, 2024

Related U.S. Application Data

(60) Provisional application No. 63/434,696, filed on Dec. 22, 2022, provisional application No. 63/426,637, filed on Nov. 18, 2022.

(51) Int. Cl.
*H04W 72/0446* (2023.01)
*H04L 27/26* (2006.01)

(52) U.S. Cl.
CPC ... *H04W 72/0446* (2013.01); *H04L 27/26025* (2021.01)

(58) Field of Classification Search
CPC .................... H04W 72/0446; H04L 27/26025
See application file for complete search history.

(56) References Cited

U.S. PATENT DOCUMENTS 10,645,733 B2 5/2020 Ji et al.
2006/0205356 A1* 9/2006 Laroia .................... H04B 7/088 455/66.1
2011/0002273 A1* 1/2011 Youn ................ H04W 36/0058 370/328
2013/0114562 A1 5/2013 Seo et al.
2018/0262378 A1 9/2018 Ma et al.
2020/0336249 A1 10/2020 Yi et al.
(Continued)

FOREIGN PATENT DOCUMENTS

WO WO-2017209585 A1 * 12/2017 ............ H04W 72/23
WO 2021162615 A1 8/2021

OTHER PUBLICATIONS

International Search Report and Written Opinion issued Feb. 29, 2024 regarding International Application No. PCT/KR2023/018596, 7 pages.
(Continued)

*Primary Examiner* — Samina F Choudhry

(57) ABSTRACT

Methods and apparatuses for multiple numerologies in wireless communication systems are provided. The methods of UE comprise: identifying first information associated with a set of SF groups including a first SF group and a second SF group, wherein the set of SF groups comprise a number of slots; determining, based on the first information, whether a SF belongs to the first SF group or the second SF group; receiving second information related to a numerology and slot length associated with the set of SF groups; and receiving or transmitting a signal in the SF based on the numerology and slot length included in the second information.

17 Claims, 21 Drawing Sheets

(56) References Cited

U.S. PATENT DOCUMENTS

| | | | |
|---|---|---|---|
| 2021/0321369 | A1 | 10/2021 | Chen |
| 2022/0173871 | A1 | 6/2022 | Luo et al. |
| 2022/0303984 | A1 | 9/2022 | He et al. |

OTHER PUBLICATIONS

"3rd Generation Partnership Project; Technical Specification Group Radio Access Network; NR; Physical channels and modulation (Release 16)", 3GPP TS 38.211 V16.6.0, Jun. 2021, 134 pages.

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

Supplementary European Search Report dated Nov. 17, 2025, in connection with European Application No. 23892086.2, 10 pages.

* cited by examiner

1400

10 ms radio frame

METHOD AND APPARATUS TO SUPPORT MULTIPLE NUMEROLOGIES IN WIRELESS COMMUNICATION SYSTEMS

CROSS-REFERENCE TO RELATED APPLICATIONS AND CLAIM OF PRIORITY

The present application claims priority to U.S. Provisional Patent Application No. 63/426,637, filed on Nov. 18, 2022, and U.S. Provisional Patent Application No. 63/434,696, filed on Dec. 22, 2022. The contents of the above-identified patent documents are incorporated herein by reference.

TECHNICAL FIELD

The present disclosure relates generally to wireless communication systems and, more specifically, the present disclosure relates to supporting multiple numerologies in wireless communication systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to multiple numerologies in wireless communication systems.

In one embodiment, a user equipment (UE) is provided. The UE comprises a processor configured to: identify first information associated with a set of subframe (SF) groups including a first SF group and a second SF group, wherein the set of SF groups comprises a number of slots; and determine, based on the first information, whether a SF belongs to the first SF group or the second SF group. The UE further comprises a transceiver operably coupled to the processor, the transceiver configured to: receive second information related to a numerology and slot length associated with the set of SF groups, and receive or transmit a signal in the SF based on the numerology and slot length included in the second information.

In another embodiment, a base station (BS) is provided. The BS comprises a processor configured to generate second information related to a numerology and slot length associated with a set of SF groups, wherein the set of SF groups comprises a number of slots. The UE further comprises a transceiver operably coupled to the processor, the transceiver configured to: transmit the second information for the numerology and slot length associated with the set of SF groups, and transmit or receive a signal in a SF based on the numerology and slot length included in the second information, wherein: first information associated with the set of SF groups including a first SF group and a second SF group is identified, and whether the SF belongs to the first SF group or the second SF group is determined based on the first information.

In yet another embodiment, a method of a UE is provided. The method comprises: identifying first information associated with a set of SF groups including a first SF group and a second SF group, wherein the set of SF groups comprises a number of slots; determining, based on the first information, whether a SF belongs to the first SF group or the second SF group; receiving second information related to a numerology and slot length associated with the set of SF groups; and receiving or transmitting a signal in the SF based on the numerology and slot length included in the second information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 14 illustrates an example of frame structure options according to various embodiments of the present disclosure;

DETAILED DESCRIPTION

FIG. 1 through FIG. 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive MIMO, full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
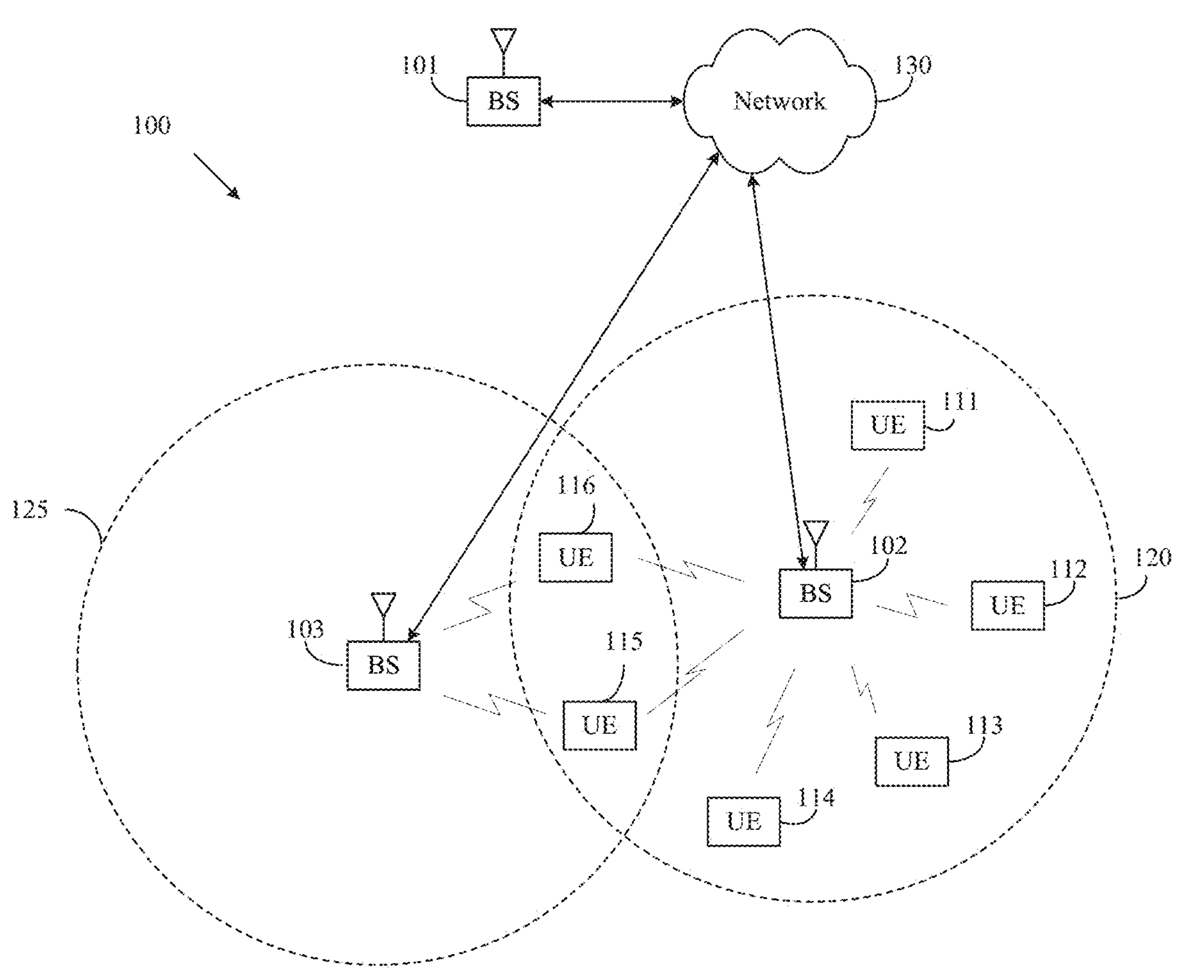
FIG. 1 illustrates an example of wireless network according to various embodiments of the present disclosure.
Figure 2:
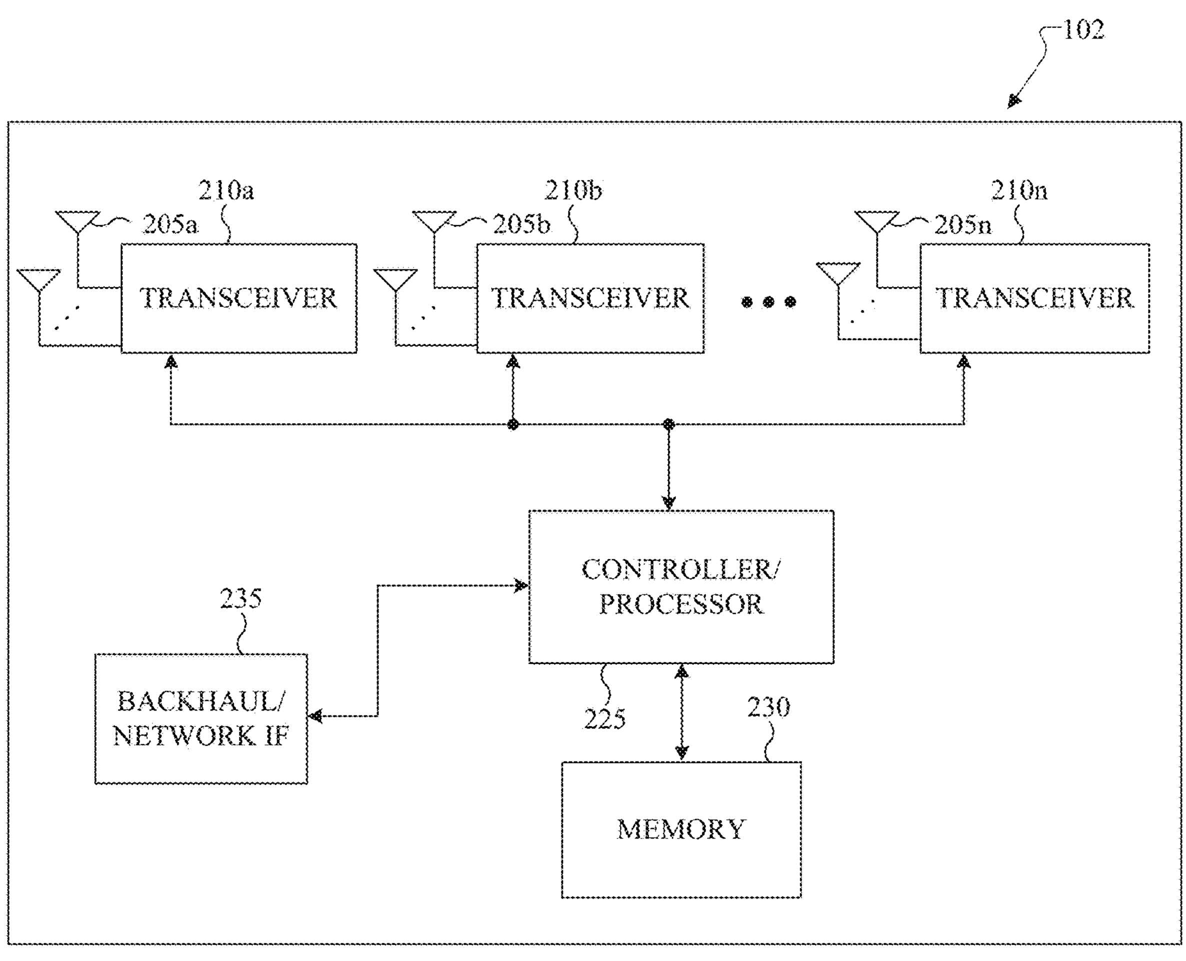
FIG. 2 illustrates an example of gNB according to various embodiments of the present disclosure.
Figure 3:
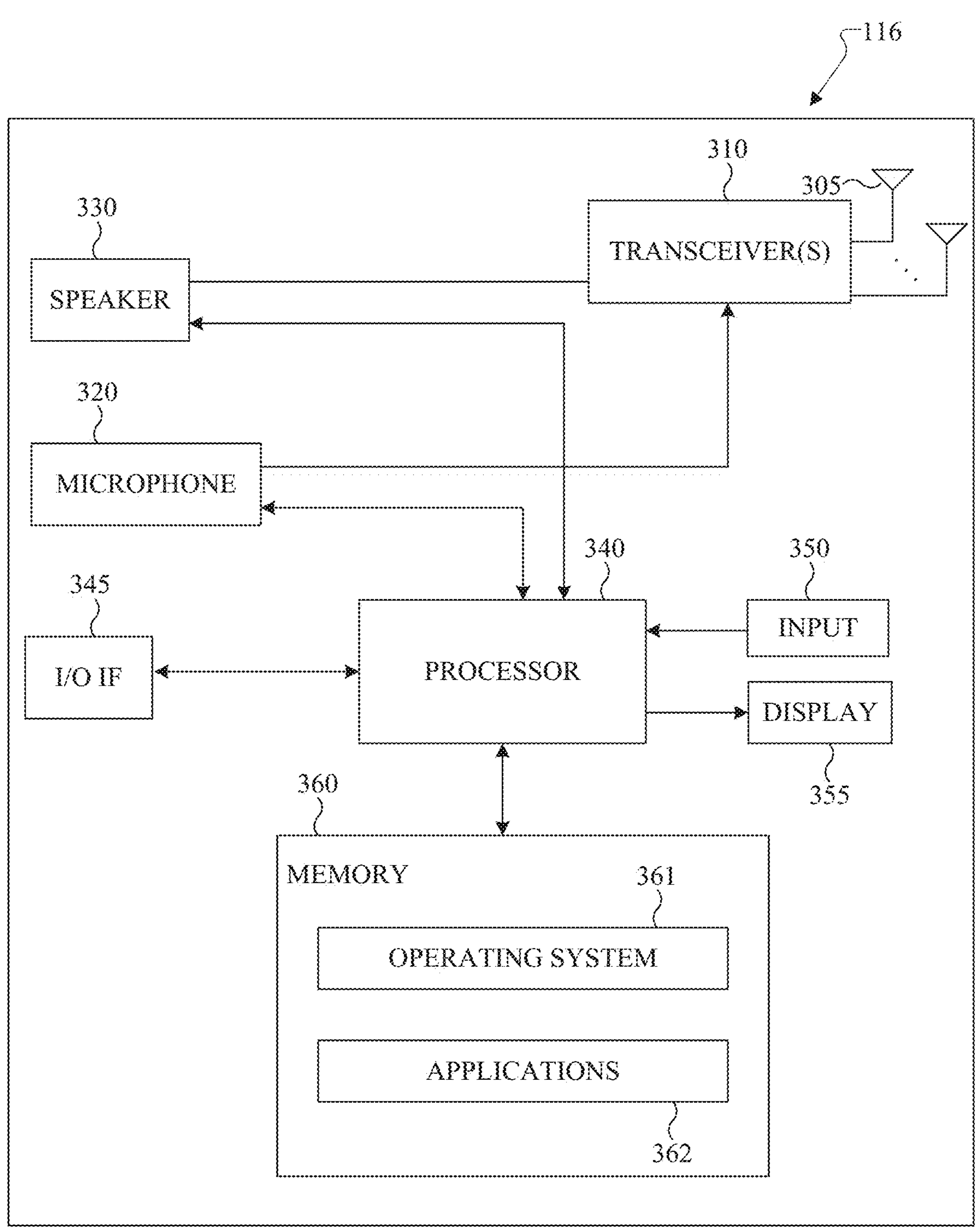
FIG. 3 illustrates an example of UE according to various embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to various embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network

130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, to support multiple numerologies in wireless communication systems. In certain embodiments, and one or more of the gNBs 101-103 includes circuitry, programing, or a combination thereof, to support multiple numerologies in wireless communication systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to various embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes to support multiple numerologies in wireless communication systems. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a wireless communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to various embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes to support multiple numerologies in wireless communication systems.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355*m* which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
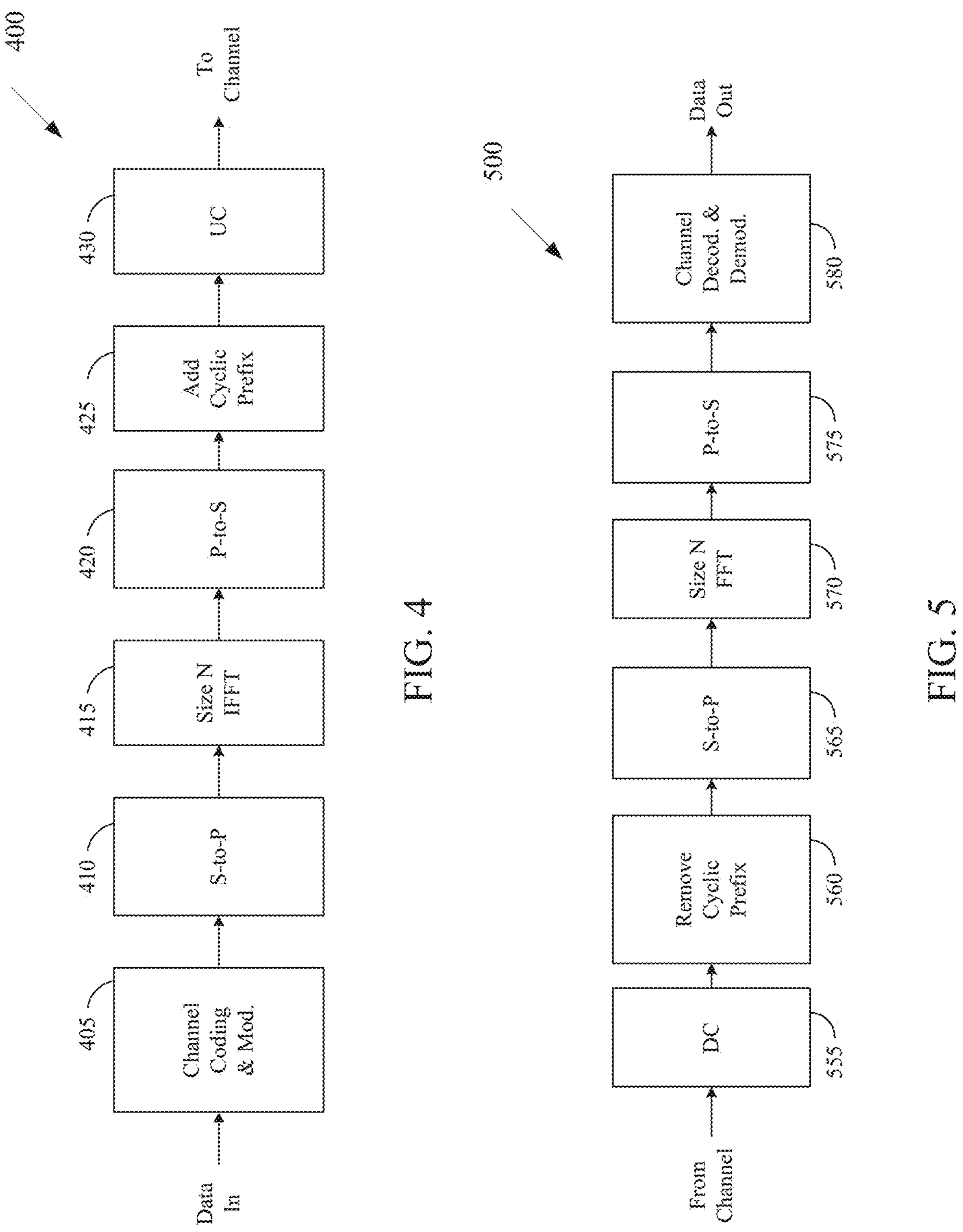
FIGS. 4 and 5 illustrate example of wireless transmit and receive paths according to various embodiments of the present disclosure.

FIG. 4 and FIG. 5 illustrate example wireless transmit and receive paths according to various embodiments of the present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support multiple numerologies in wireless communication systems.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a TCI state of a CORESET where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as a radio resource control (RRC) signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a MIMO transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Rel. 14 LTE and Rel. 15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6.

Figure 6:
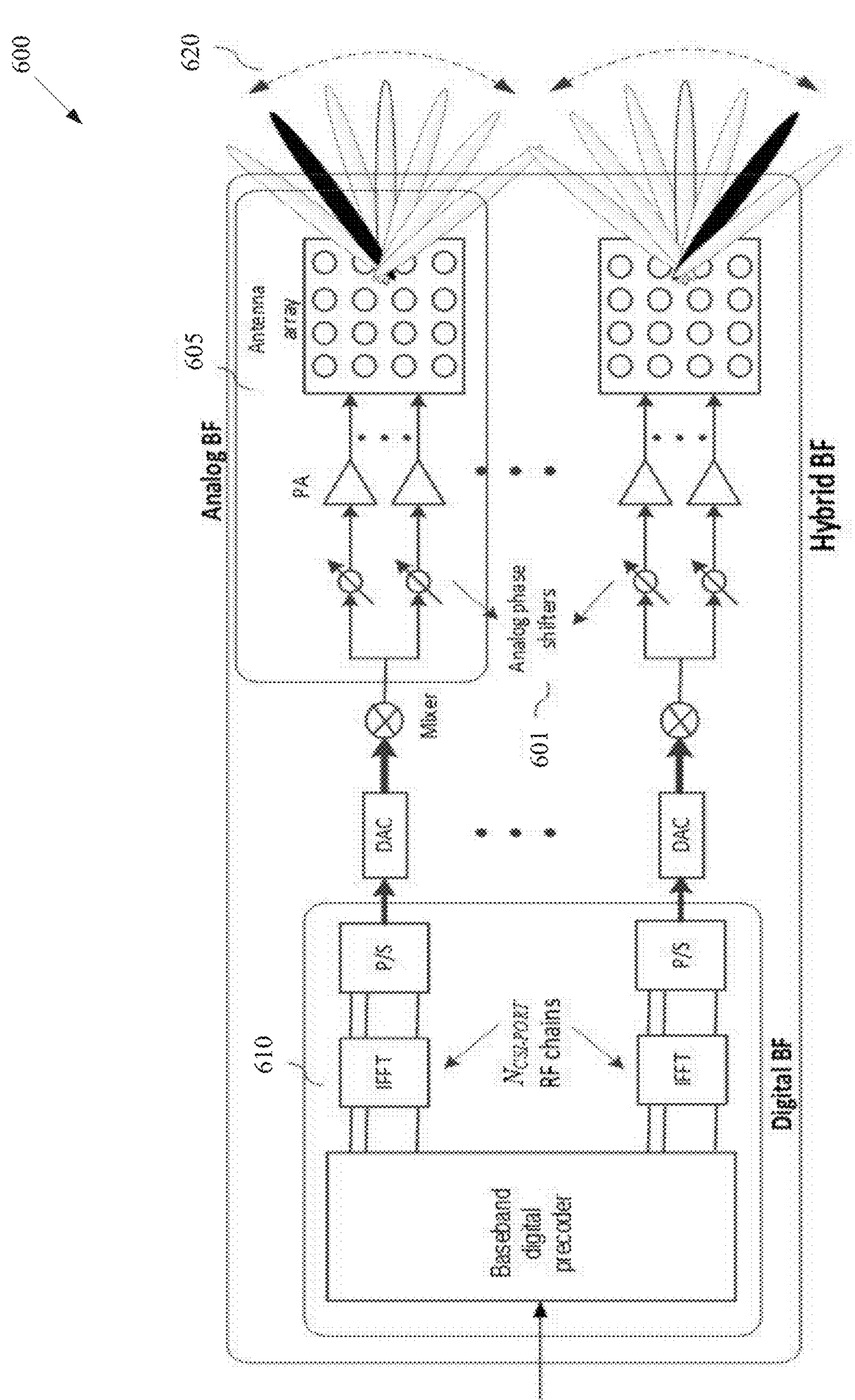
FIG. 6 illustrates an example of antenna structure according to various embodiments of the present disclosure.

FIG. 6 illustrates an example antenna structure 600 according to various embodiments of the present disclosure. An embodiment of the antenna structure 600 shown in FIG. 6 is for illustration only.

In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports NCSI-PORT. A digital beamforming unit 610 performs a linear combination across NCSI-PORT analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Figure 7:
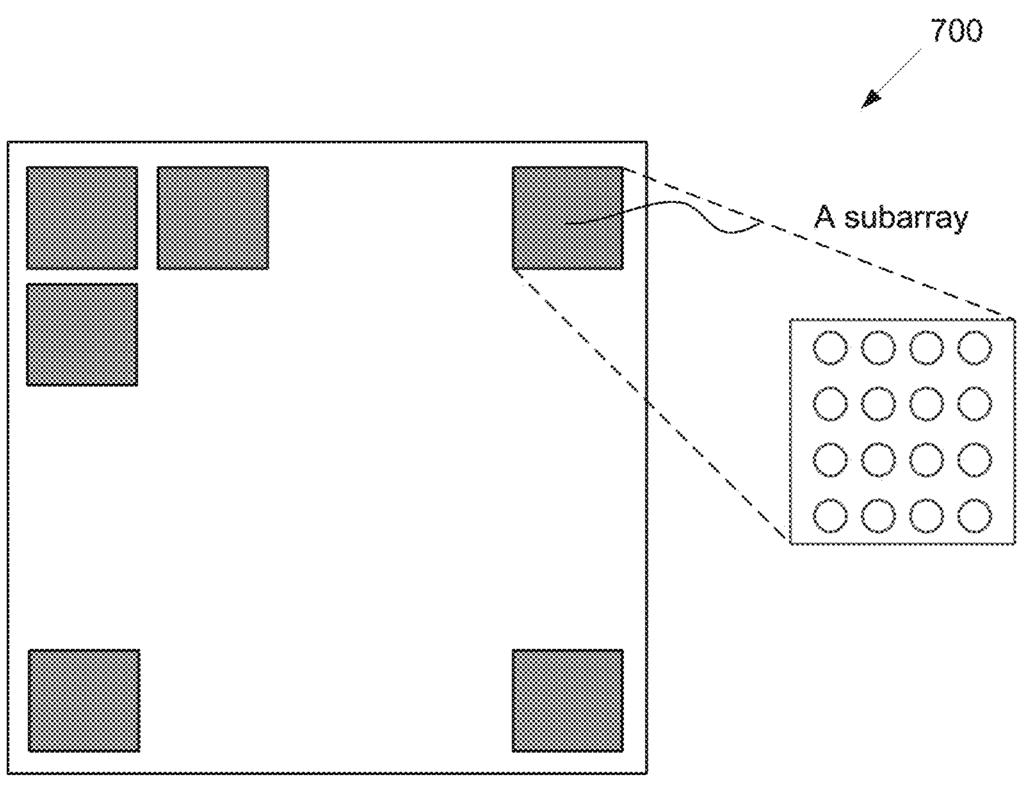
FIG. 7 illustrates an example of an antenna panel comprising $N_T$ antenna elements according to various embodiments of the present disclosure.

FIG. 7 illustrates an example of an antenna panel comprising $N_T$ antenna elements 700 according to various embodiments of the present disclosure. An embodiment of the antenna panel comprising $N_T$ antenna elements 700 shown in FIG. 7 is for illustration only.

FIG. 7 describes an antenna panel comprising $N_T$ antenna elements, which are partitioned into subarrays of equal number of elements, say $N_A$ antenna elements. The total number of subarrays is denoted as $N_D$, and $N_D=N_T/N_A$.

Figure 8:
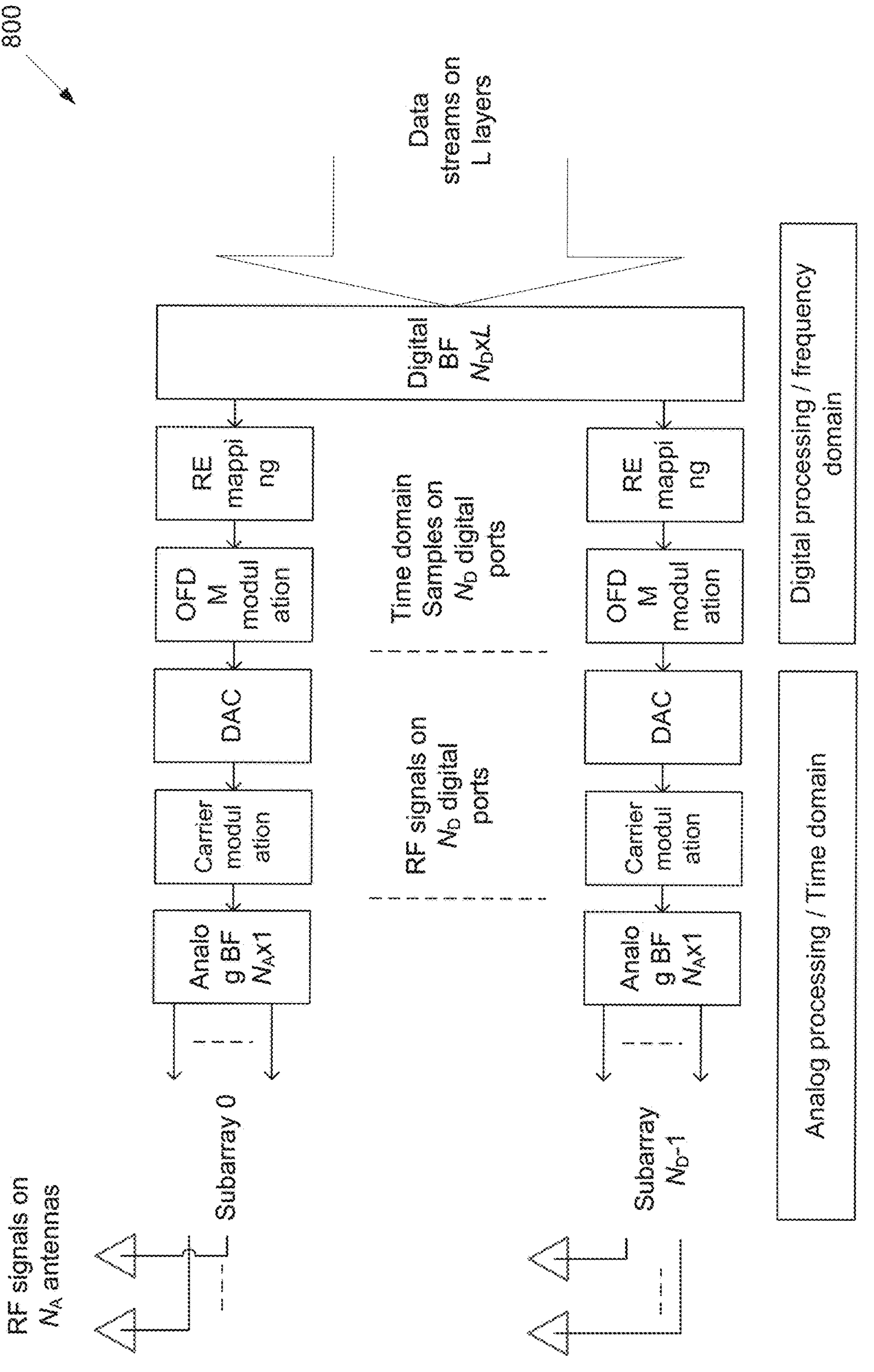
FIG. 8 illustrates an example of an RF frontend and baseband implementation for a base station according to various embodiments of the present disclosure.

FIG. 8 illustrates an example of RF frontend and baseband implementation for a base station 800 according to various embodiments of the present disclosure. An embodiment of the RF frontend and baseband implementation for a base station 800 shown in FIG. 8 is for illustration only.

FIG. 8 shows an RF frontend and baseband implementation for a base station equipped with the antenna panel in FIG. 7. This RF frontend is one possible implementation of hybrid analog-digital beamforming. The $N_T$ RF signals to be emitted from the antenna panel is constructed according to FIG. 8.

Starting from the right, L data streams, or L sequences of modulation symbols are provided to digital beamformer (BF), which may convert L streams to Np data streams, with multiplying a digital precoder $$p_k^D,$$

whose dimension is $N_D \times L$, on the resource elements comprising a physical resource block (PRB) bundle k, wherein $k=0, \ldots, N_{PRB\text{-}bundles}-1$, and $N_{PRB\text{-}bundles}$ is the total number of PRB bundles that the data stream is mapped to.

The modulation symbols on each of $N_D$ data streams are then mapped to resource elements, go through OFDM modulation, and are finally converted to time domain samples. These time domain samples are converted to analog, go through carrier modulation, and an analog signal is obtained for each of these $N_D$ paths.

Then, the analog signal goes through analog BF block, where an analog precoder $$p_d^A$$

of size $N_A \times 1$ is applied for path d, where $d=0, \ldots, N_D-1$. Applying analog BFs for the signals on all the $N_D$ paths, the RF signals on $N_T=N_A \times N_D$ antenna elements are constructed.

Figure 9:
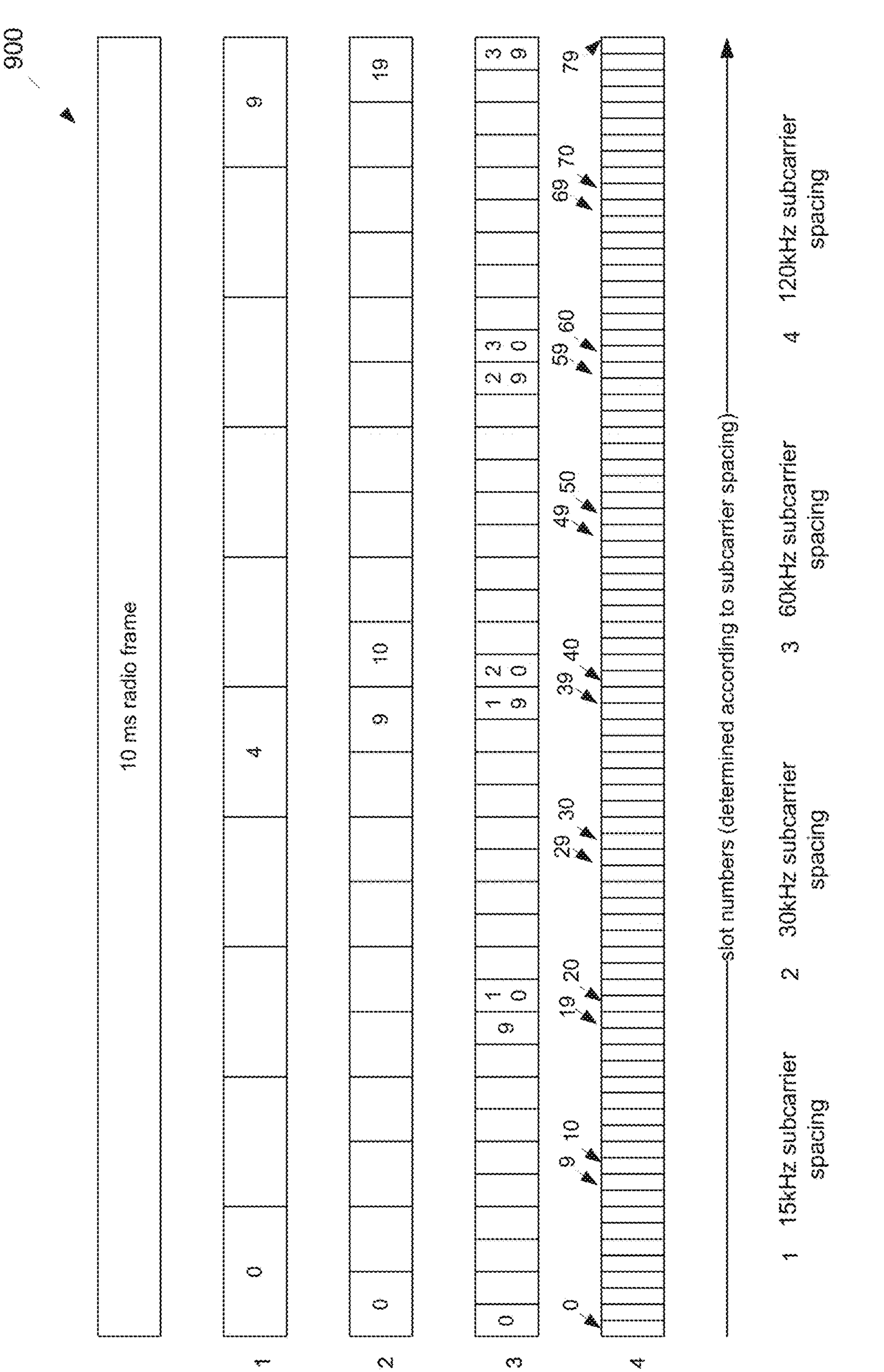
FIG. 9 illustrates an example of 5G NR frame structure according to various embodiments of the present disclosure.

FIG. 9 illustrates an example of 5G NR frame structure 900 according to various embodiments of the present disclosure. An embodiment of the 5G NR frame structure 900 shown in FIG. 9 is for illustration only.

FIG. 9 describes 5G NR frame structure, wherein 10 ms radio frame is partitioned into multiple slots, differently for different subcarrier spacing configurations. The frame structure parameters determined according to the subcarrier spacing values are summarized in TABLE 1.

TABLE 1

| Frame structure parameters | | | |
|---|---|---|---|
| Subcarrier spacing (kHz) | Number of slots per 10 msec radio frame | Slot duration (msec) | Number of OFDM symbols per msec |
| 15 | 10 | 1 | 14 |
| 30 | 20 | 0.5 | 28 |
| 60 | 40 | 0.25 | 56 |
| 120 | 80 | 0.125 | 108 |
| 240 | 160 | 0.0625 | 216 |

In 5G NR, a slot comprises a number of consecutive OFDM symbols. In L2 point of view, a slot may correspond to a typical time duration in which a TB is transmitted over the air; unless otherwise configured, transmission of a TB is confined within a slot duration. In L1 point of view, a slot corresponds to the OFDM symbol grids comprising one or more MIMO layers, each of which comprises a number of consecutive OFDM symbols on which the L1-processed TB is mapped.

One potential issue of the legacy frame structure of FIG. 9 is that the number of slots per radio frame increases as subcarrier spacing increases. This causes implementation challenges in L2 and upper-PHY implementations for higher subcarrier spacing cases. For example, required number of L2 scheduling decisions per 10 msec become large, e.g., 80 and 160 for 120 and 240 kHz subcarrier spacing cases, which requires higher number of computing cores at the L2. In particular, for massive MIMO or X-MIMO applications where L2 MU-MIMO scheduling burden is huge, it may limit the number of scheduling decisions per ms to be a small number to make the base station implementation more efficient.

Figure 10:
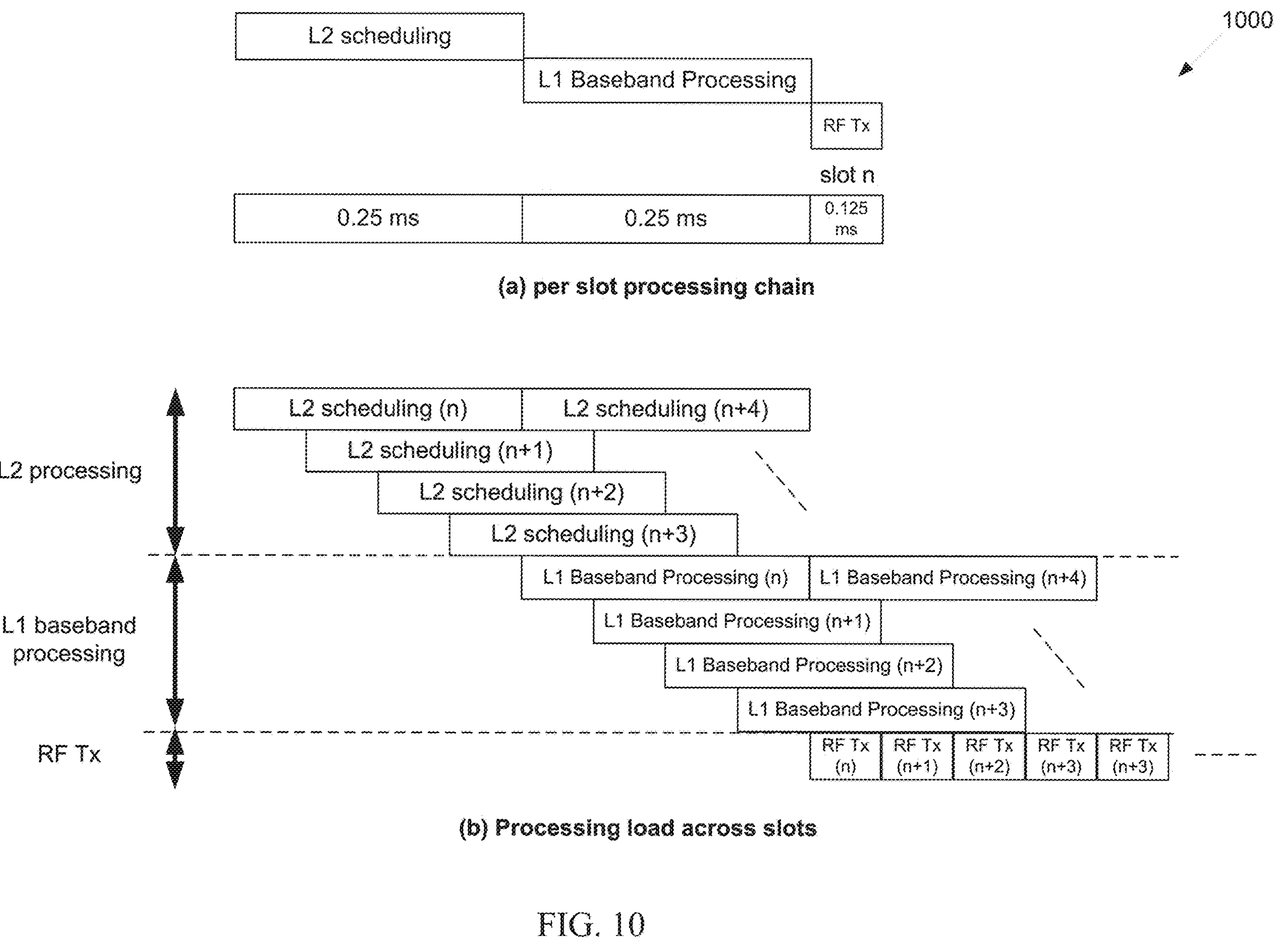
FIG. 10 illustrates an example of per slot processing chain and processing load across slots according to various embodiments of the present disclosure.

FIG. 10 illustrates an example of per slot processing chain and processing load across slots 1000 according to various embodiments of the present disclosure. An embodiment of the per slot processing chain and processing load across slots 1000 shown in FIG. 10 is for illustration only.

The issue is illustrated in FIG. 10. In FIG. 10 illustration of per slot processing (e.g., FIG. 10(*a*)), L2 scheduling takes 0.25 msec per slot and L1 base band processing takes 0.25 msec per slot. The RF time slot duration is 0.125 msec. In FIG. 10 (e.g., (b)), L2-L1-RF processing across 5 consecutive slots is illustrated. To continuously feed necessary data to L1 baseband and RF Tx modules, L2 needs to parallel process scheduling decision of multiple (i.e., 4) slots. Similarly, L1 baseband also needs to parallel process 4 slots. The more required parallel processing, the more computing resources are needed. This costs higher CAPEX and implementation cost, which can hinder market adoption of these higher-end base stations.

A UE is configured with a number of subframe groups, of which a first subframe group corresponds to those subframes for which the default numerology and slot configuration are used. For each of the subframe number groups other than the first subframe group, the UE is configured with an alternative OFDM numerology and an alternative slot configuration. When a subframe number belongs to a certain subframe number group, the UE configures the UE receiver and transmitter to use the alternative numerology and the alternative slot configurations corresponding to the parameters configured for the subframe number group. Here, subframes partitions a 10 msec radio frame into equal durations, e.g., 1 msec/subframe or 0.5 msec/subframe.

The information conveyed through configuration of numerology and slot structure include at least some of slot duration, number of OFDM symbols per slot, CP length, number of subcarriers per PRB.

Figure 11:
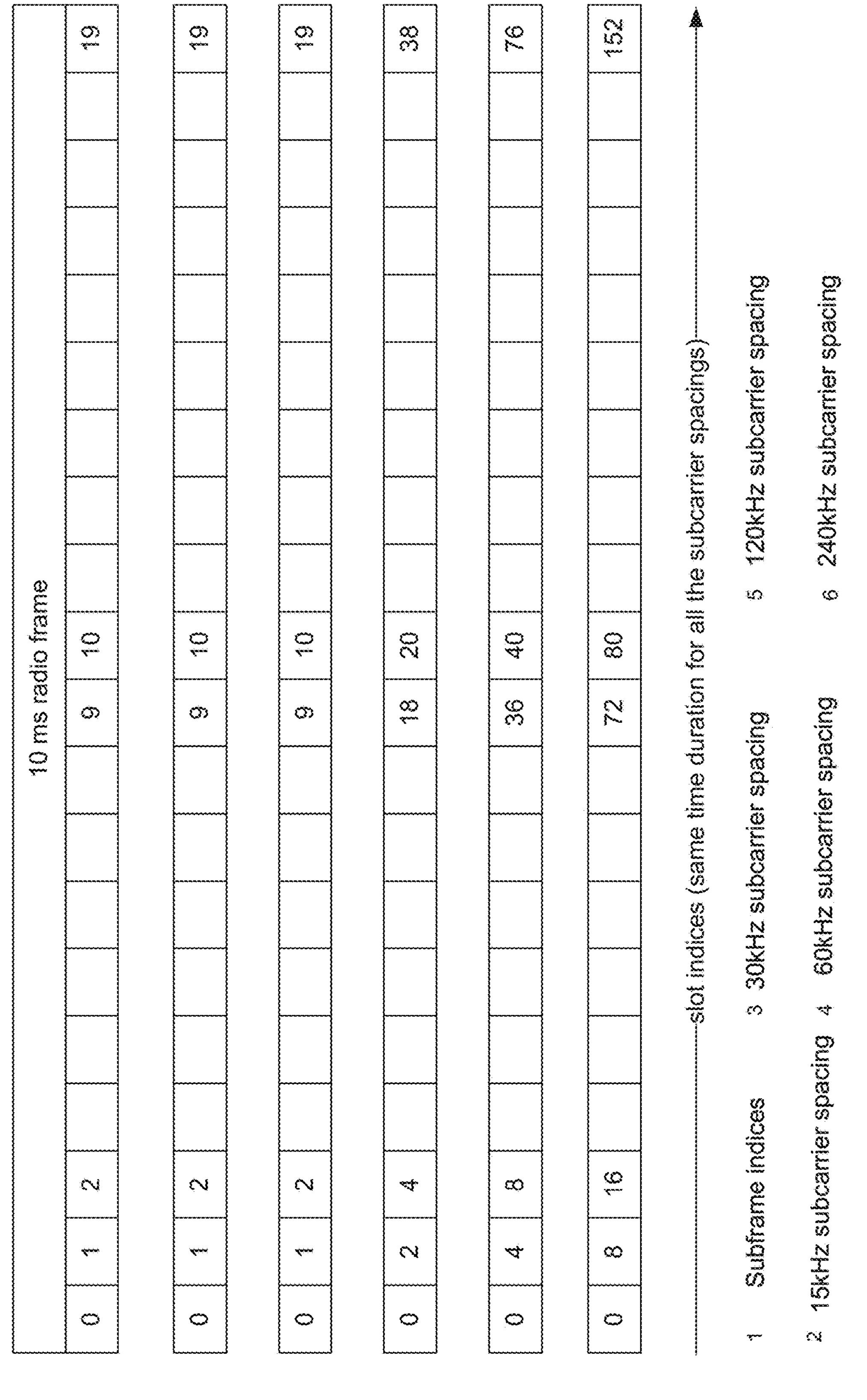
FIG. 11 illustrates an example of one frame structure design according to various embodiments of the present disclosure.

FIG. 11 illustrates an example of one frame structure design 1100 according to various embodiments of the present disclosure. An embodiment of the one frame structure design 1100 shown in FIG. 11 is for illustration only.

TABLE 2

| Parameters | | | | | | | | |
|---|---|---|---|---|---|---|---|---|
| Subcarrier spacing index μ | Subcarrier spacing (kHz) = $2^{\mu} \cdot 15$ kHz | Number of slots per 10 msec radio frame | Slot duration (msec) | Slot number per subframe | Slot index increment | Number of OFDM symbols per slot = $2^{\mu} \cdot 7$ | Number of subcarriers per PRB | CP length = $2^{-\mu} \cdot X$ |
| 0 | 15 | 20 | 0.5 | 1 | 1 | 7 | 12 | X |
| 1 | 30 | 20 | 0.5 | 1 | 1 | 14 | 12 | X/2 |
| 2 | 60 | 20 | 0.5 | 1 | 2 | 28 | 12 | X/4 |
| 3 | 120 | 20 | 0.5 | 1 | 4 | 56 | 12 | X/8 |
| 4 | 240 | 20 | 0.5 | 1 | 8 | 118 | 12 | X/16 |

FIG. 11 and TABLE 2 illustrate some embodiments of the present disclosure that overcome the challenges of higher CAPEX and implementation cost. In this design, the slot time duration is a constant across all the subcarrier spacing values, but a number of OFDM symbols per slot become different for different subcarrier spacing values. The main benefit of this design is that the L2 processing burden does not increase as the subcarrier spacing value increases.

Similar to 5G NR and LTE, a subframe duration is also defined, so that the system has absolute time measure. Here, a subframe length is chosen to be 0.5 msec. When slot length and subframe length are the same by default, the legacy subframe duration of 1 msec is too long to support low latency applications, and 0.5 msec can be a better choice.

In TABLE 2, it is illustrated that the number of OFDM symbols per slot linearly scales with the configured subcarrier spacing value. When the subcarrier spacing value doubles, the number of OFDM symbols per slot doubles. The base number of OFDM symbols per slot for 15 kHz subcarrier spacing is 7. When the subcarrier spacing doubles to 30 kHz from 15 kHz, the number of OFDM symbols per slot also doubles to 14 from 7; and so on.

In FIG. 11 and TABLE 2, slot indices are determined differently depending on the configured subcarrier spacing. It is provided to determine the slot numbers according to subframe index, subcarrier-spacing-specific slot index increment as in the following way: (slot number)=(subframe index)·(slot index increment). With this slot numbering, the slot number specific scrambling for DMRS can be used, even when the number of OFDM symbols per slot changes based on configurations.

TABLE 3

| Parameters | | | | |
|---|---|---|---|---|
| Subcarrier spacing index μ | Subcarrier spacing (kHz) = $2^{\mu} \cdot 15$ kHz | Number of OFDM symbols per slot = $2^{\mu} \cdot 8$ | Number of subcarriers per PRB | CP length = $2^{-\mu} \cdot Y$ |
| 0 | 15 | 8 | 16 | Y |
| 1 | 30 | 16 | 16 | Y/2 |
| 2 | 60 | 32 | 16 | Y/4 |
| 3 | 120 | 64 | 16 | Y/8 |
| 4 | 240 | 128 | 16 | Y/16 |

In some embodiments, to easily be able to partition the OFDM symbols comprising a slot into smaller groups, the base number of OFDM symbols per slot is configured to be 8, instead of 7. In such a case, the number of OFDM symbols per slot is determined according to TABLE 3. When the subcarrier spacing value doubles, the number of OFDM symbols per slot doubles. The base number of OFDM symbols per slot for 15 kHz subcarrier spacing is 8. When the subcarrier spacing doubles to 30 kHz from 15 kHz, the number of OFDM symbols per slot also doubles to 16 from 8; and so on.

Additionally, a number of subcarriers per PRB may also be updated to 16, to further facilitate easy mappings and partitions of various overhead channels, e.g., for multi-port CSI-RS/DMRS mapping in the frequency domain, where a number of ports is defined as a power of 2.

It is observed that TABLE 3 may result in higher number of OFDM symbols in each 0.5 msec time duration than TABLE 2. Hence, it is expected that the CP overhead is more with TABLE 3 than TABLE 2 if the same CP length is used in both tables.

In order to maintain the same overhead in two different frame structure methods, the system needs to configure smaller CP length in TABLE 3 than that in TABLE 2. The drawback of this approach is that the ISI-free coverage is shrunk with the approach with TABLE 3. It is provided that the network is allowed to choose one of these frame structure methods considering the cell size, and indicate the UE of the choice of the frame structure, i.e., between {Option 1: longer CP+smaller number of OFDM symbols per slot} and {Option 2: shorter CP+larger number of OFDM symbols per slot}, wherein both options result in the same CP overhead. For larger cell coverage, the network configures Option 1; and for smaller cell coverage the network configures Option 2.

Figure 12:
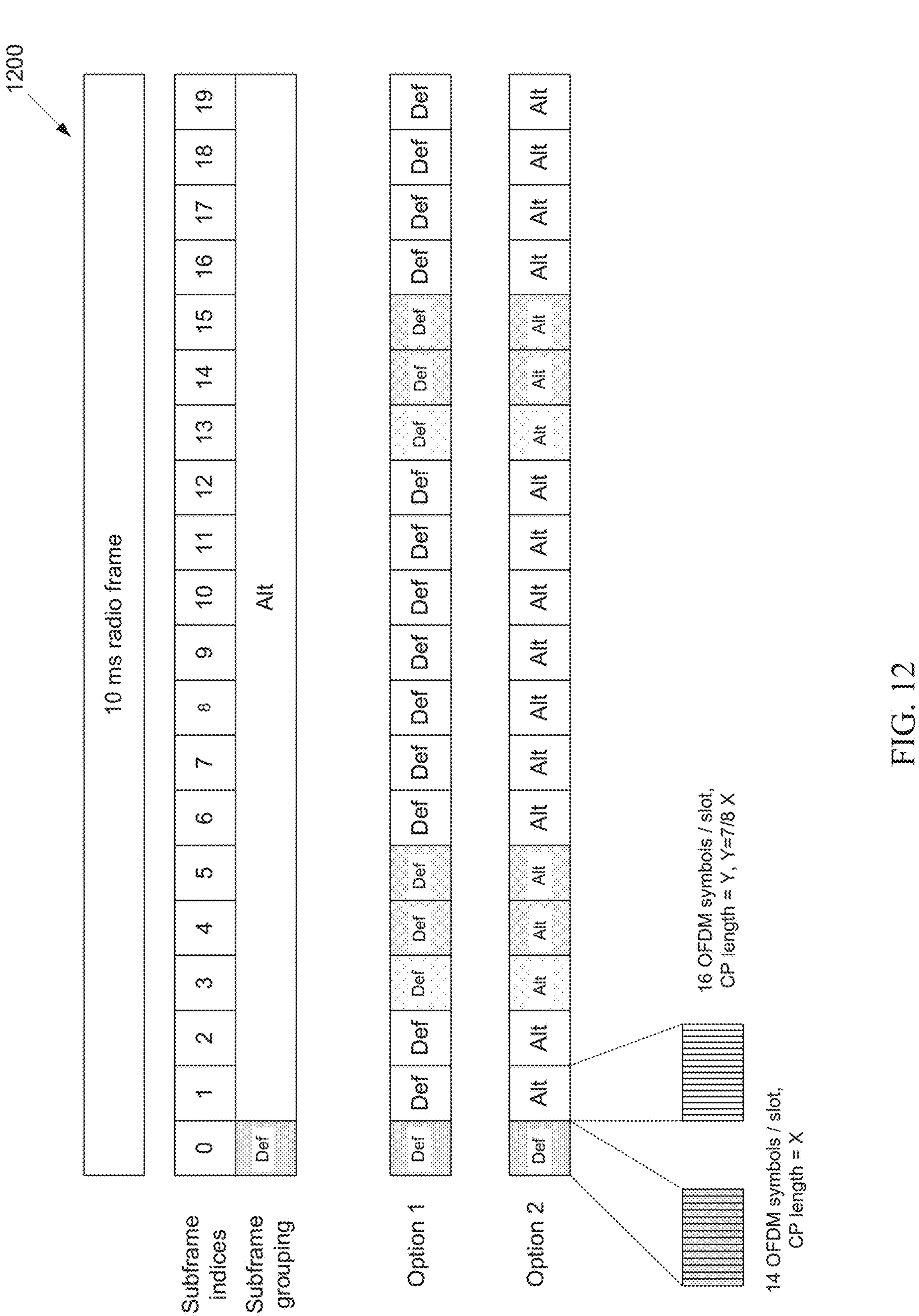
FIG. 12 illustrates an example of OFDM numerologies and slot structures according to various embodiments of the present disclosure.

FIG. 12 illustrates an example of OFDM numerologies and slot structures 1200 according to various embodiments of the present disclosure. An embodiment of the OFDM numerologies and slot structures 1200 shown in FIG. 12 is for illustration only.

FIG. 12 illustrates an example of default and alternative OFDM numerologies and slot structures. This illustration is constructed based on 30 kHz subcarrier spacing.

The subframe indices are partitioned into two groups, a default group and an alternative group. In this example, subframes {0} correspond to a default-numerology subframe group, and the other subframes correspond to an alternative-numerology subframe group. Correspondingly, OFDM numerology for slot 0 may be according to the default one, i.e., 14 OFDM symbols per slot, and OFDM numerology for slots other than 0 can be configured via broadcast signaling.

A UE is configured with {Option 1: 14 OFDM symbols/slot and CP length X} for default slots, and the UE is configured with {Option 2: 16 OFDM symbols/slot and CP length Y=7/8 X} for alternative slots. Depending on the subframe number and signaling that determines Option 1 vs. Option 2, the UE determines which number of OFDM symbols to use for PDSCH and PDCCH demodulation.

The number of OFDM symbols/slot for these slots other than OH slots can be configured via broadcast signaling, e.g., a master information block (MIB) or a system information block (SIB), or implicitly configured through scrambling of PHY signals in the OH slots. On the other hand, the number of OFDM symbols/slot for those OH slots is pre-configured.

FIG. 12 illustrates 30 kHz subcarrier spacing cases. The number of OFDM symbols per slot for other subcarrier spacing values for those slots other than OH slots scale according to TABLE 2 and TABLE 3. Depending on the configured state in the broadcast signaling, the number of OFDM symbols is chosen from {7, 14, 28, 56, 118} or {8, 16, 32, 64, 128}.

In general, a UE can be configured of a parameter that jointly determines CP length and number of OFDM symbols per slot duration (e.g., per 0.5 msec duration, per 1 msec duration, etc.) via higher-layer broadcast signaling that can be in MIB or SIB. The signaling can also be UE specific signaling—dynamically via DCI or semi-statically via RRC.

Figure 13:
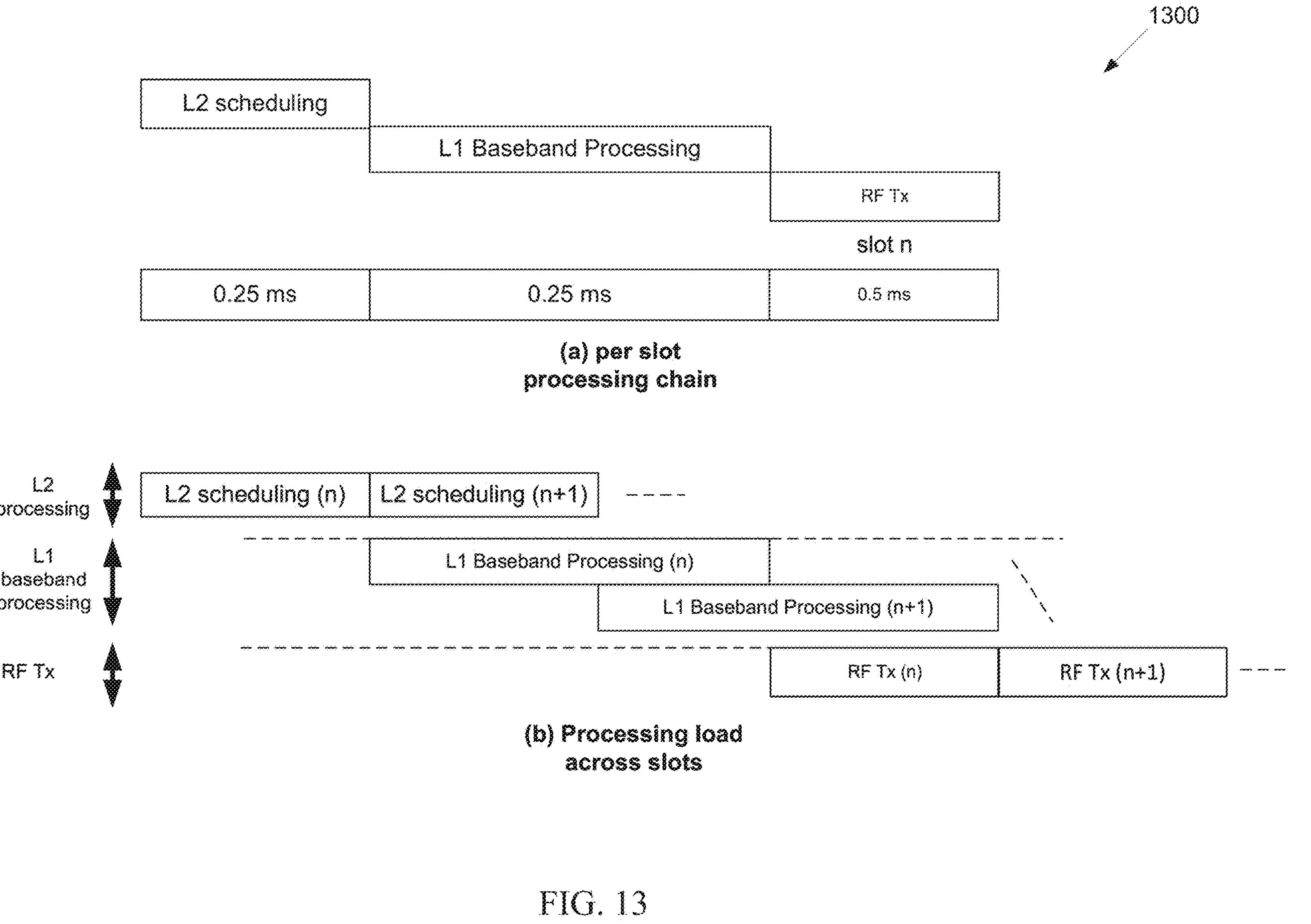
FIG. 13 illustrates an example of new frame structure design according to various embodiments of the present disclosure.

FIG. 13 illustrates an example of new frame structure design 1300 according to various embodiments of the present disclosure. An embodiment of the new frame structure design 1300 shown in FIG. 13 is for illustration only.

The advantage of the new frame structure design is illustrated in FIG. 13. In FIG. 13 (e.g., (a) in FIG. 13) illustration of per slot processing, L2 scheduling takes 0.25 msec per slot and L1 base band processing takes 0.5 msec per slot. The RF time slot duration is 0.5 msec. In FIG. 13 (e.g., (b) in FIG. 13), L2-L1-RF processing across 2 consecutive slots is illustrated. To continuously feed necessary data to L1 baseband and RF Tx modules, L2 scheduling can be done back-to-back across slots, without requiring parallel processing. On the other hand, L1 baseband still needs parallel processing of 2 slots, but the number of slots to parallel process is significantly reduced from the case of FIG. 10 (e.g., (b) in FIG. 10). Comparing FIG. 13 from FIG. 10, it may be observed that the number of required processing cores can be reduced based on the new frame structure design.

Figure 14:
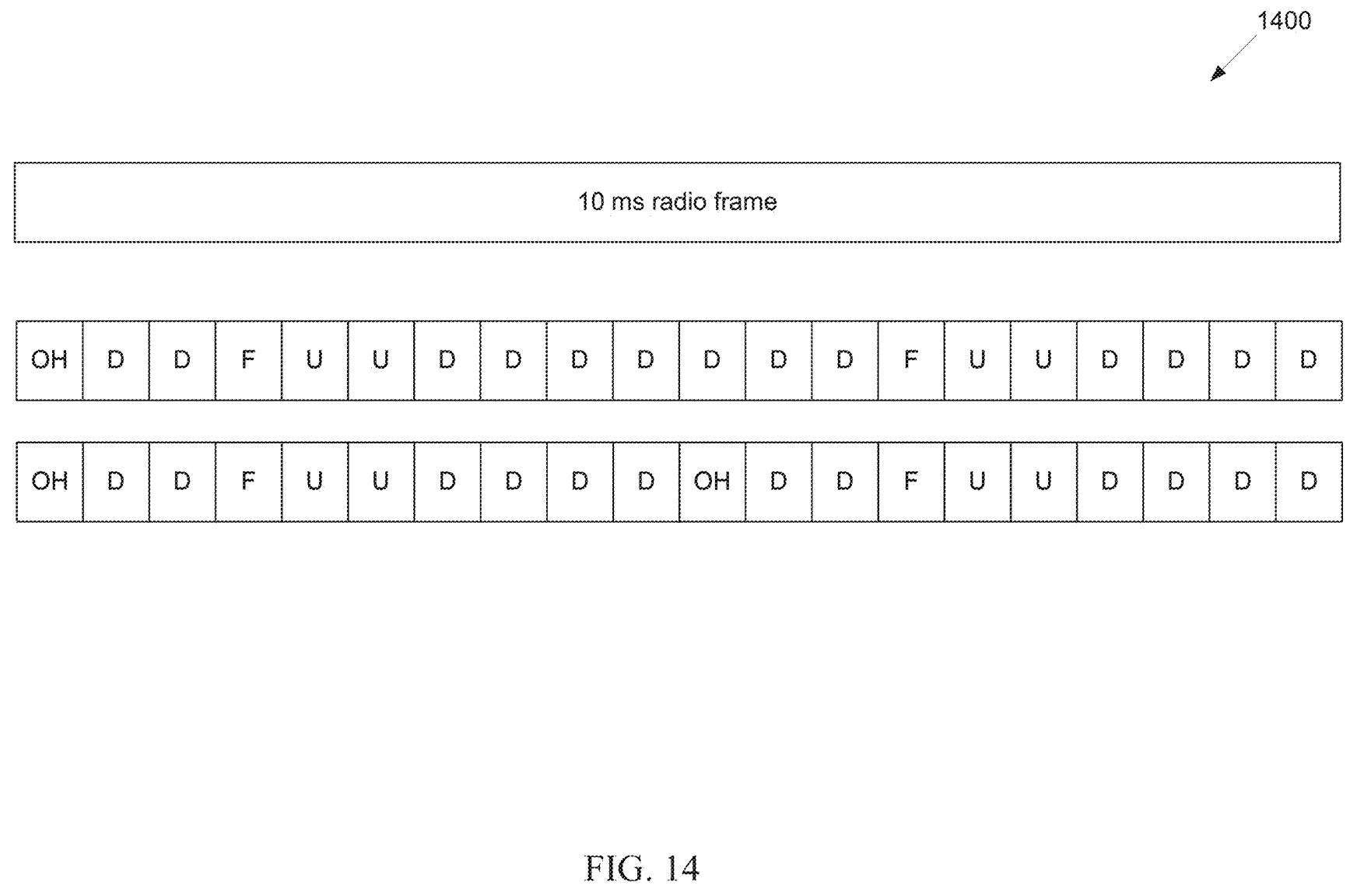

FIG. 14 illustrates an example of frame structure options 1400 according to various embodiments of the present disclosure. An embodiment of the frame structure options 1400 shown in FIG. 14 is for illustration only.

FIG. 14 illustrates frame structure options according to some embodiments of the present disclosure. The 10 msec radio frame is partitioned into 20 slots. In one embodiment, one slot out of these 20 slots is designated as an overhead (OH) slot. In another embodiment, two slots out of 20 slots are designated as OH slots.

In these overhead slots, PSS/SSS/PBCH/CSI-RS/TRS/BRS are transmitted. Common control signaling, like SIBs can also be scheduled in these slots. In case of multi-beam operation, multiple copies of these signals on multiple beams are transmitted in the OH slots, similarly to multiple SSBs in 5G-NR. In case the same radio frame structure is repeated across all the radio frames, the overhead owing to these OH slots may be 5 or 10%, which is reasonably small.

In some embodiments, one of these frame structures illustrated in FIG. 9 and FIG. 14 are configured as default by the standards specification. After UE's acquiring DL synchronization, the slot duration and corresponding frame structures can be updated via higher-layer signaling, e.g., MIB in PBCH, SIBx in PDSCH, or UE specific RRC signaling in PDSCH.

For this purpose, a number of designated slots during a number of radio frames are transmitted according to "default" slot structure, specified by various numerology parameters, e.g., subcarrier spacing value, number of subcarriers per PRB, number of OFDM symbols per slot, CP length, etc. At least those OH slots are configured the default slot structure. After acquiring sync and decoding MIB and/or SIBs in those OH slots, the UE acquire information on slot structure information of the other slots from those signals sent in these designated slots.

In some embodiments, the default configuration is determined according to TABLE 4, in order for the newer generation network to offer the same coverage as 4G LTE and 5G NR.

TABLE 4

| Default configuration | | |
|---|---|---|
| Configuration category | Sub-category | Parameters |
| OFDM numerology | Numerology | Subcarrier spacing, number of subcarriers per PRB, CP length, etc. |
| | Slot structure | Slot duration, number of symbols per slot duration, etc. |

TABLE 4 illustrates parameters that are configured for OFDM signal transmission and reception according to some embodiments of the present disclosure. Numerology parameters include subcarrier spacing, number of subcarriers per PRB, CP length, etc., and slot structure parameters include slot duration, number of symbols per slot duration, etc. In some embodiments, all these parameters can be called as OFDM numerology parameters.

In one embodiment, a number of slots within 10 msec radio frame are designated as OH slots, in which SSB (SS/PBCH block, comprising PSS, SSS, PBCH) is transmitted. These OFDM signals transmitted in these OH slots are generated according to "default" OFDM numerology and "default" slot structure, e.g., based on TABLE 2 or TABLE 3. The OFDM numerology parameters and slot structure parameters for the other slots (denoted as "alternative" numerology and "alternative" slot structure) are indicated via signaling whose PHY channels are transmitted within those OH slots. For example, the signaling can be transported in MIB (on PBCH), in SIB (on PDSCH), or through specific scrambling (i.e., specific scrambling ID of certain PHY signal (e.g., PBCH DMRS, PSS, SSS) corresponds to specific numerology & slot parameter combination), etc.

Figure 15:
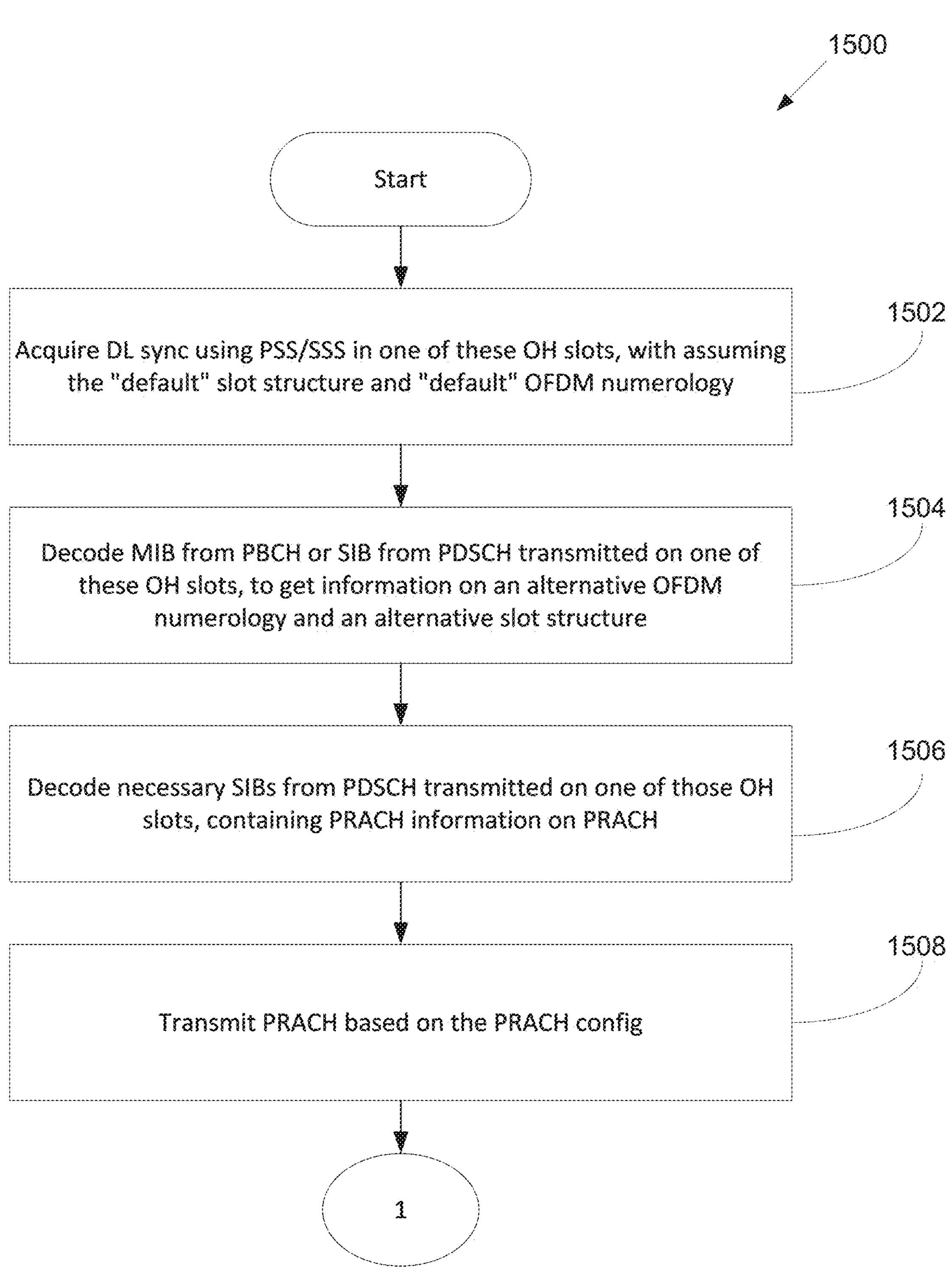
FIG. 15 illustrates a flowchart of UE method for acquiring information according to various embodiments of the present disclosure.

FIG. 15 illustrates a flowchart of UE method 1500 for acquiring information according to various embodiments of the present disclosure. The UE method 1500 as may be performed by a UE (e.g., 111-116 as illustrated in FIG. 1). An embodiment of the UE method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

FIG. 15 illustrates a method of UE's acquiring information on an "alternative" slot structure and an "alternative" OFDM numerology according to some embodiments of the present disclosure. The information is provided in MIB on PBCH and/or SIB on PDSCH, wherein PBCH and/or PDSCH is transmitted on those designated OH slots. PRACH configuration information (e.g., PRACH numerology, PRACH transmission occasion, etc.) is also transmitted on those designated OH slots.

As illustrated in FIG. 15, in step 1502, the UE acquires DL sync using PSS/SSS in one of these OH slots, with assuming the "default" slot structure and "default" OFDM numerology. In step 1504, the UE decodes MIB from PBCH or SIB from PDSCH transmitted on one of these OH slots, to get information on an alternative OFDM numerology and an alternative slot structure. In step 1506, the UE decodes necessary SIBs from PDSCH transmitted on one of those OH slots, containing PRACH information on PRACH. In step 1508, the UE transmits PRACH based on the PRACH config.

Figure 16:
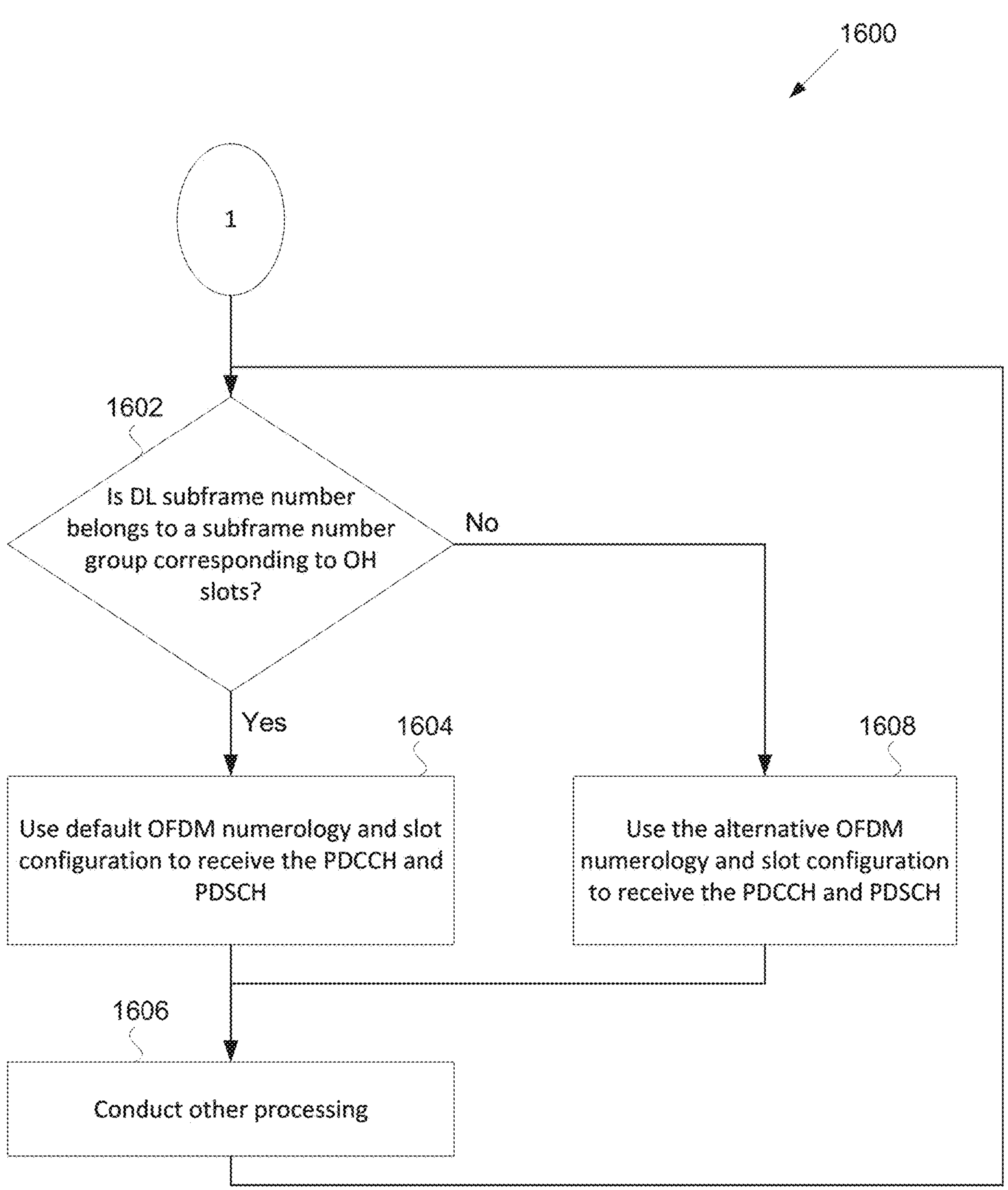
FIG. 16 illustrates a flowchart of UE method to determine OFDM numerology and slot configuration according to various embodiments of the present disclosure.

FIG. 16 illustrates a flowchart of UE method 1600 to determine OFDM numerology and slot configuration according to various embodiments of the present disclosure. The UE method 1600 as may be performed by a UE (e.g., 111-116 as illustrated in FIG. 1). An embodiment of the UE method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

FIG. 16 illustrates a UE's method to determine OFDM numerology and slot configuration based on some embodiments of the present disclosure. After receiving the configuration as in FIG. 15 on default and alternative numerology and slot structure, the UE is aware of a first group of subframe numbers for which default numerology is applied, and a second group of subframe numbers for which alternative numerology is applied. Depending on the subframe number, UE adjust the DL receiver accordingly. If the subframe number belongs to a subframe number group comprising OH slots, the UE configures the UE receiver to use the default numerology and default slot configurations to receives PDCCH and PDSCH. Otherwise, the UE configures the UE receiver to use the alternative numerology and alternative slot configurations to receive PDCCH and PDSCH.

As illustrated in FIG. 16, in step 1602, the UE determines whether DL subframe number belongs to a subframe number group corresponding to OH slots. In step 1604, the UE uses default OFDM numerology and slot configuration to receive the PDCCH and PDSCH. In step 1608, the UE conducts other processing. In step 1608, the UE uses the alternative OFDM numerology and slot configuration to receive the PDCCH and PDSCH.

In more general cases, the UE is configured with a number of subframe groups, of which a first subframe group corresponds to those subframes for which the default numerology and slot configuration are used. The number of subframe number groups are disjoint, and the union of all these subframe number groups correspond to the entire set of subframe numbers. For each of the subframe number groups other than the first subframe group, the UE is configured with an alternative OFDM numerology and an alternative slot configuration. When a subframe number belongs to a certain subframe number group, the UE configures the UE receiver and transmitter to use the alternative numerology and the alternative slot configurations corresponding to the parameters configured for the subframe number group.

Figure 17:
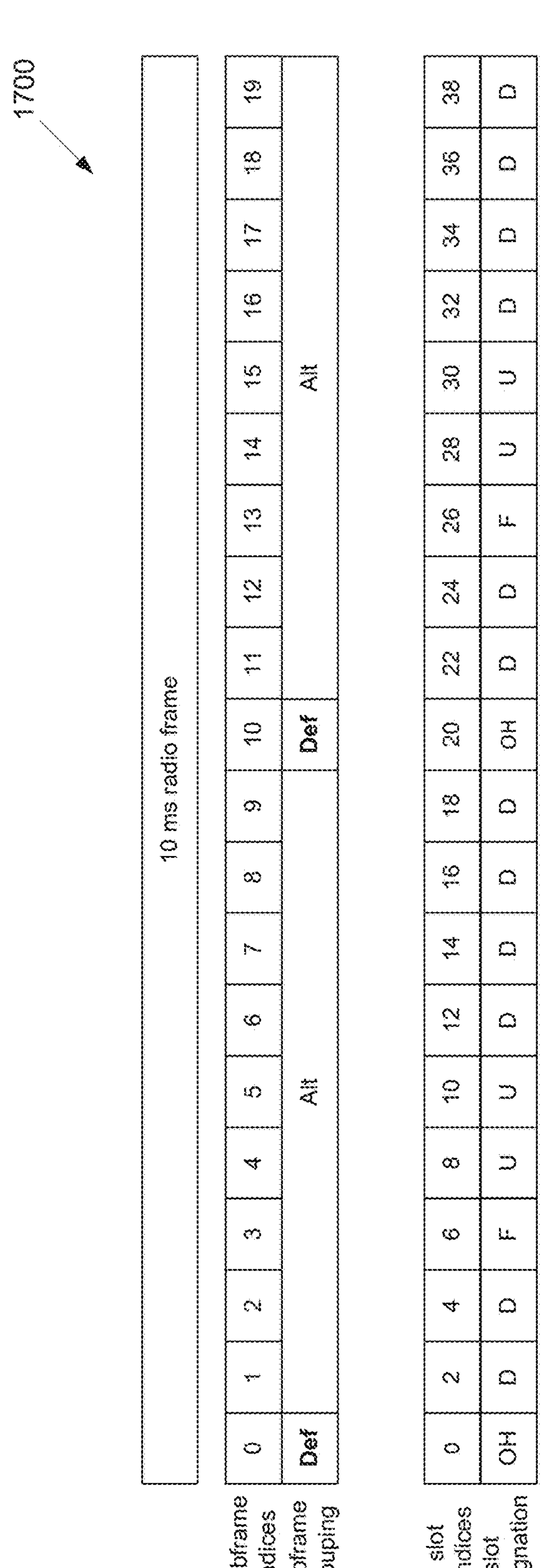
FIG. 17 illustrates an example of subframe grouping and numerology and slot structure options according to various embodiments of the present disclosure.
Figure 17:
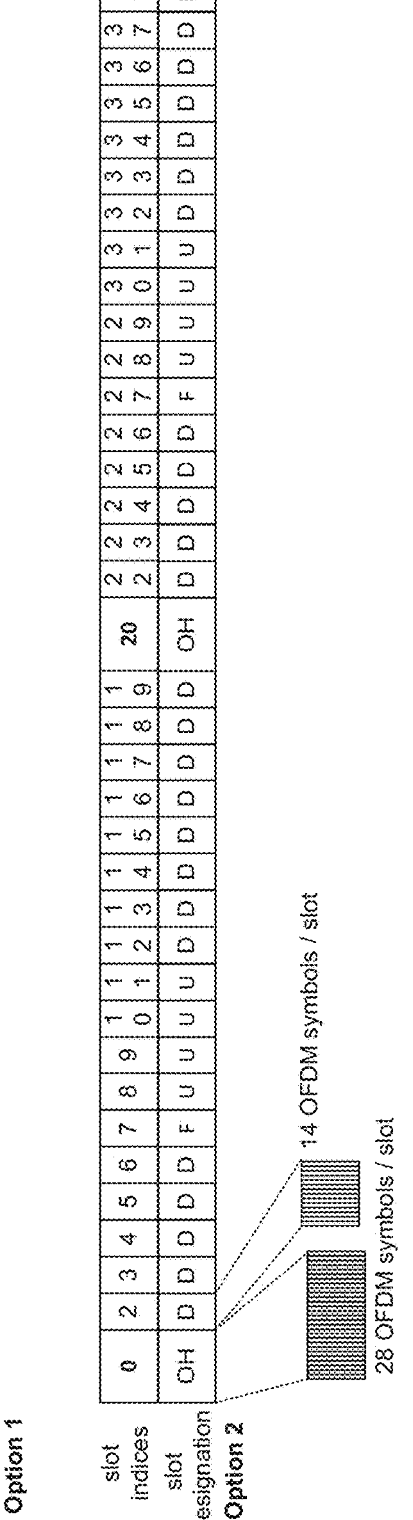

FIG. 17 illustrates an example of subframe grouping and numerology and slot structure options 1700 according to various embodiments of the present disclosure. An embodiment of the subframe grouping and numerology and slot structure options 1700 shown in FIG. 17 is for illustration only.

FIG. 17 illustrates an example of subframe grouping and numerology & slot structure options that can be configured to UE, according to some embodiments of the present disclosure. This illustration is constructed based on 60 kHz subcarrier spacing.

The subframe indices are partitioned into two groups, a default group and an alternative group. In this example, subframes {0, 10} correspond to a default-numerology subframe group, and the other subframes correspond to an alternative-numerology subframe group. Correspondingly, OFDM numerology for slots 0 and 20 may be according to the default one, i.e., 28 (or 32) OFDM symbols per slot, and OFDM numerology for slots other than 0 and 20 can be configured via broadcast signaling.

The broadcast signaling indicates which of Option 1 and Option 2 may be used for the alternative subframe group.

When Option 1 is configured, the UE assumes all the subframes are configured with the default numerology, i.e., 28 or 32 OFDM symbols per slot.

When Option 2 is configured, the UE assumes that each of those slots corresponding to Alt subframe group is configured with 0.25 msec/slot and 14 (or 16) OFDM symbols per slot. For those slots configured with alternative numerology, i.e., 0.25 msec/slot, the adjacent slot indices are consecutive integers. The slot number gap from default-numerology slot of length 0.5 msec to alternative-numerology slot of length 0.25 msec is 2. For example, slot 0 is of a default numerology, and a next slot, slot 2, is of an alternative numerology, and slot number 1 is unused in this case.

In one embodiment, a few UL subframes during a number of radio frames (denoted as a first group of UL subframes) are designated with the default numerology and slot parameters, and the alternative OFDM numerology and the alternative slot parameters are to be used for the other UL subframes (denoted as a second group of UL subframes).

FIG. 16 illustrates a UE's method to determine OFDM numerology and slot configuration based on some embodiments of the present disclosure.

After receiving the configuration as in FIG. 16 on default and alternative numerology and slot structure, the UE is aware of a first group of subframe numbers for which default numerology is applied, and a second group of subframe numbers for which alternative numerology is applied. Depending on the subframe number, UE adjust the UL transmitter accordingly. If the subframe number belongs to the first subframe number group, the UE configures the UE transmitter to use the default numerology and default slot configurations to transmit PUSCH and PUCCH. If the subframe number belongs to the second subframe number group, the UE configures the UE transmitter to use the alternative numerology and alternative slot configurations to transmit PUSCH and PUCCH. In some embodiments, the first group of subframe numbers is pre-configured according to standards specification. In alternative embodiments, UE configures all the UL slots according to the alternative numerology and the alternative slot structure parameters configured according to FIG. 16.

In some embodiments, UE is configured with a PRB size via higher-layer signaling, broadcast signaling via MIB or SIB, or RRC signaling. The PRB size signaling contents facilitate the UE to determine number of subcarriers per PRB and number of PRBs in the system bandwidth and in the configured bandwidth part.

A default PRB size can be used for initial access, i.e., in default numerology slots. The default PRB size can be e.g., 12 or 16.

For those slots corresponding to alternative-numerology subframes, an alternative PRB size can be configured. Alternative PRB sizes can be an integer multiple of 8, 12, 16.

TABLE 5

| | PRB size | Number of PRBs for 100 MHz, 30 kHz subcarrier spacing |
|---|---|---|
| Option 1 | 12 | 273 |
| Option 2 | 16 | 204 |
| Option 3 | 24 | 133 |
| Option 4 | 32 | 102 |
| Option 5 | 8 | 408 |
| . . . | | |

TABLE 5 illustrates a few optional values configured for PRB size and number of PRBs, for 100 MHz and 30 kHz subcarrier spacing.

Upon the configured PRB size, the bit width of the scheduling assignment for the DCI also changes as bit width of "frequency domain resource assignment" is defined in terms of number of PRBs for the configured BWP. This way, when the PRB size is configured to be a larger value, the number of bits needed to indicate scheduling assignment can be reduced, which can help the network to increase the PDCCH coverage and to reduce PDCCH overhead.

Also, the PRB size configuration helps to achieve the effects of multiple PRB bundling. UE may assume that a same precoder is applied across all the resource elements comprising a PRB, wherein the PRB size is variable. Then network can configure the PRB size flexibly considering the frequency selectivity of the channels. If the channel is highly frequency selective, the network configures smaller PRB size; and if the channel is less frequency selective, the network configures larger PRB size.

In some embodiments, the load of parallel processing can be mitigated by mapping the PDSCH/PUSCH across multiple slots, with maintaining a fixed set of frame structure parameters (e.g., the slot definition, etc., as described in TABLE 1). Instead, the network can configure a number of slots used for the PDSCH mapping as a function of the number of parallel processing implemented.

Figure 19:
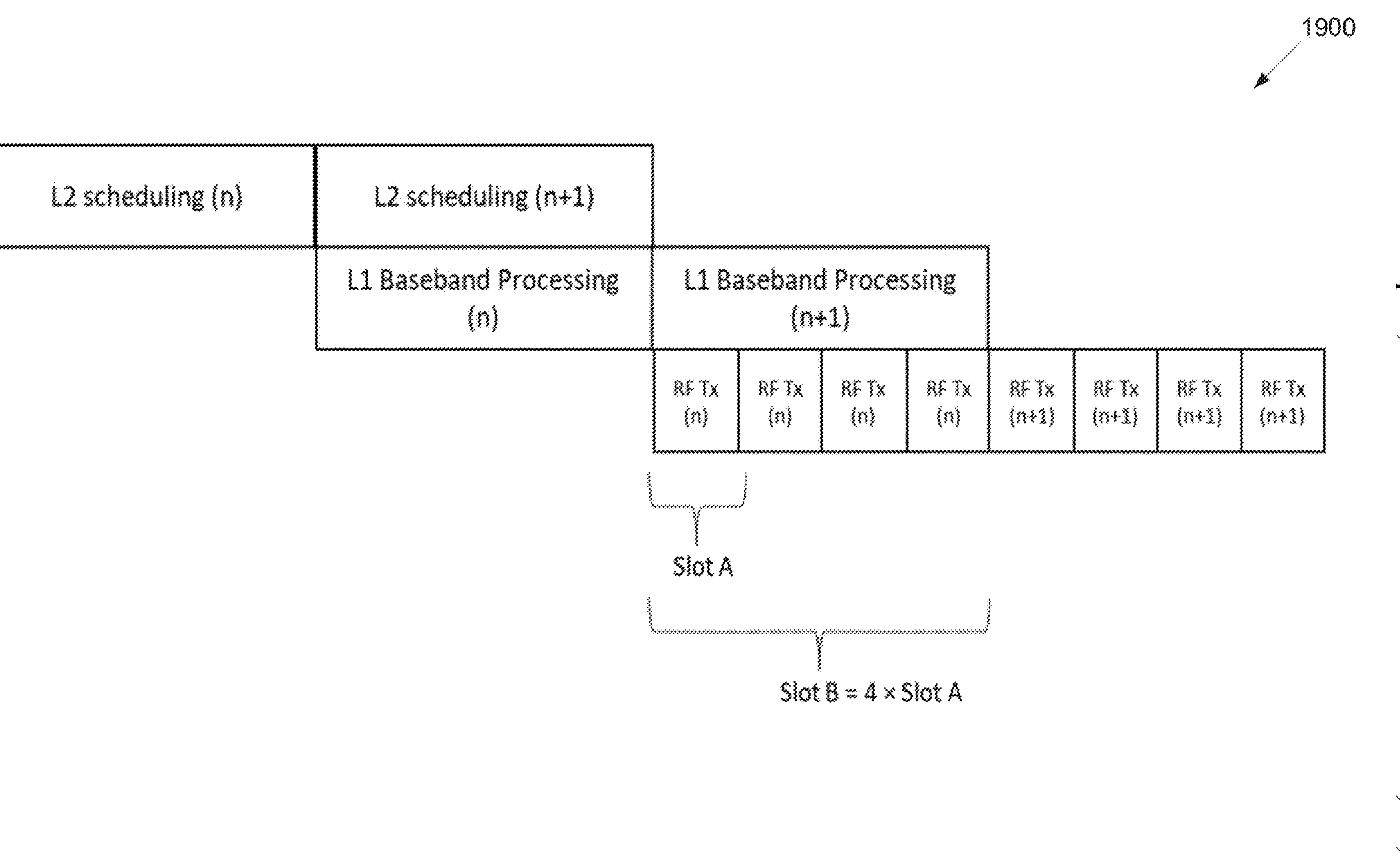
FIG. 19 illustrates an example of L2 scheduling and L1 baseband processing according to various embodiments of the present disclosure.

In some embodiments, a UE is configured with "super-slots," wherein a super-slot refers to a number of consecutive slots, and the number is signaled via a broadcast message, e.g., MIB or SIB. When super-slots are configured, the super-slots are used as a unit of DL/UL processing and scheduling instead of slots, and may serve as transmission time intervals (TTIs). The super-slot configuration is valid within the "alternative" subframes, as illustrated in FIG. 12 or FIG. 19; and default slots are used in those "default" subframes. A super-slot comprises those OFDM symbols comprising the number of consecutive slots. DCI in PDCCH scheduling a PDSCH or a PUSCH is transmitted within a super slot.

When configured with super slots, the time duration of a PDSCH or a PUSCH transmission scheduled by a DCI is within a super slot. In some embodiments, DCI contents and payload for time domain scheduling are adapted according to the super-slot length. For example, the starting OFDM symbol number range and the length of PDSCH/PUSCH in OFDM symbols are indicated differently depending on the super-slot length. If super-slot length is 1 (i.e., the same as the slot length), the starting symbol value can be one of 0, . . . , 13; and the length can be 1, . . . , 13. If super-slot length is 2, the starting symbol value can be one of 0, . . . , 27; and the length can be 1, . . . , 28. The time duration of a PUCCH is also within a super slot.

In some embodiments, the DCI payload is maintained to be the same for the time domain resource indication for the PHY resource scheduling regardless of the super slot configuration. The number of candidate values (of the bit widths) of those fields signaled in the DCI may be kept the same across different super-slot sizes, e.g., by uniform subsampling with a factor of N, wherein N is the number of slots in a super slot. One example is illustrated in TABLE 6.

TABLE 6

| Super slot length | | |
|---|---|---|
| Super slot length | 1 | 2 |
| Candidate values for starting OFDM symbols for the scheduled resource | 0, 1, 2, . . . , 13 (14 values) | 0, 2, 4, . . . , 26 (14 values) |
| Candidate values for the number of OFDM symbols for the scheduled resource | 1, 2, . . . , 14 (14 values) | 2, 4, . . . , 28 (14 values) |

Figure 18:
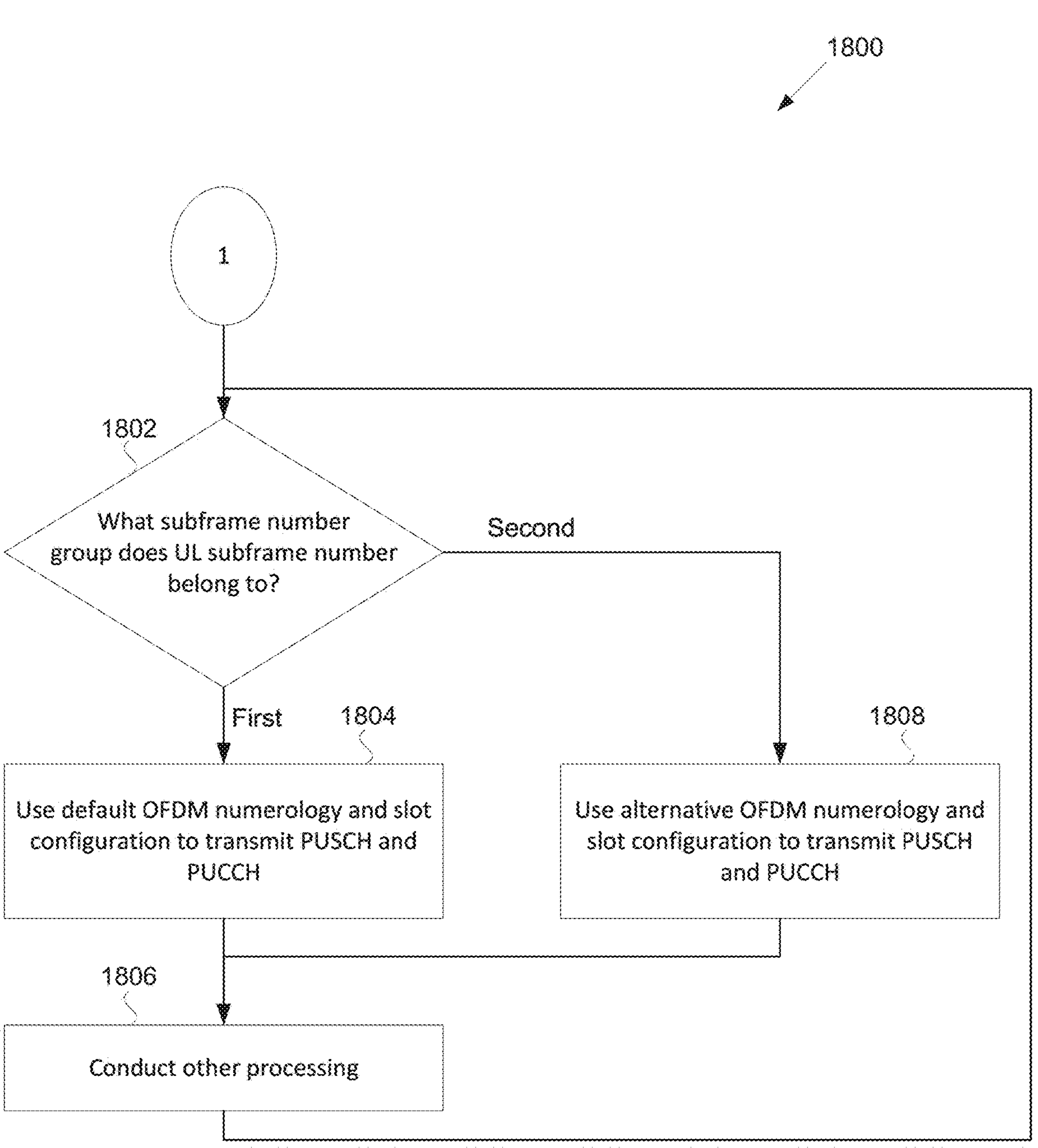
FIG. 18 illustrates a flowchart of UE method to determine OFDM numerology and slot configuration according to various embodiments of the present disclosure.

FIG. 18 illustrates a flowchart of UE method 1800 to determine OFDM numerology and slot configuration according to various embodiments of the present disclosure. The UE method 1800 as may be performed by a UE (e.g., 111-116 as illustrated in FIG. 1). An embodiment of the UE method 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

As illustrated in FIG. 18, in step 1802, the UE determines what subframe number group does UL subframe number belong to. In step 1804, the UE uses default OFDM numerology and slot configuration to transmit PUSCH and PUCCH. In step 1806, the UE conducts other processing. In step 1808, the UE uses alternative OFDM numerology and slot configuration to transmit PUSCH and PUCCH.

FIG. 19 illustrates an example of L2 scheduling and L1 baseband processing 1900 according to various embodiments of the present disclosure. An embodiment of the L2 scheduling and L1 baseband processing 1900 shown in FIG. 19 is for illustration only.

An example is as shown in FIG. 19, where no parallel processing is required for L2 scheduling and L1 baseband processing. Slot A in the figure can be 0.125 ms for the subcarrier spacing of 120 kHz. L2 and L1 processing both consume 0.5 ms in this example. The resulting PDSCH can be mapped to 4 RF transmission time slots (each with 0.125 ms) after the completion of the L1 processing. An alternative slot definition for this multi-slot RF Tx can be defined, which is labelled Slot B (4×Slot A) in FIG. 19. In some embodiments, slot B is denoted as super-slot, and slot A is denoted as slot.

Figure 20:
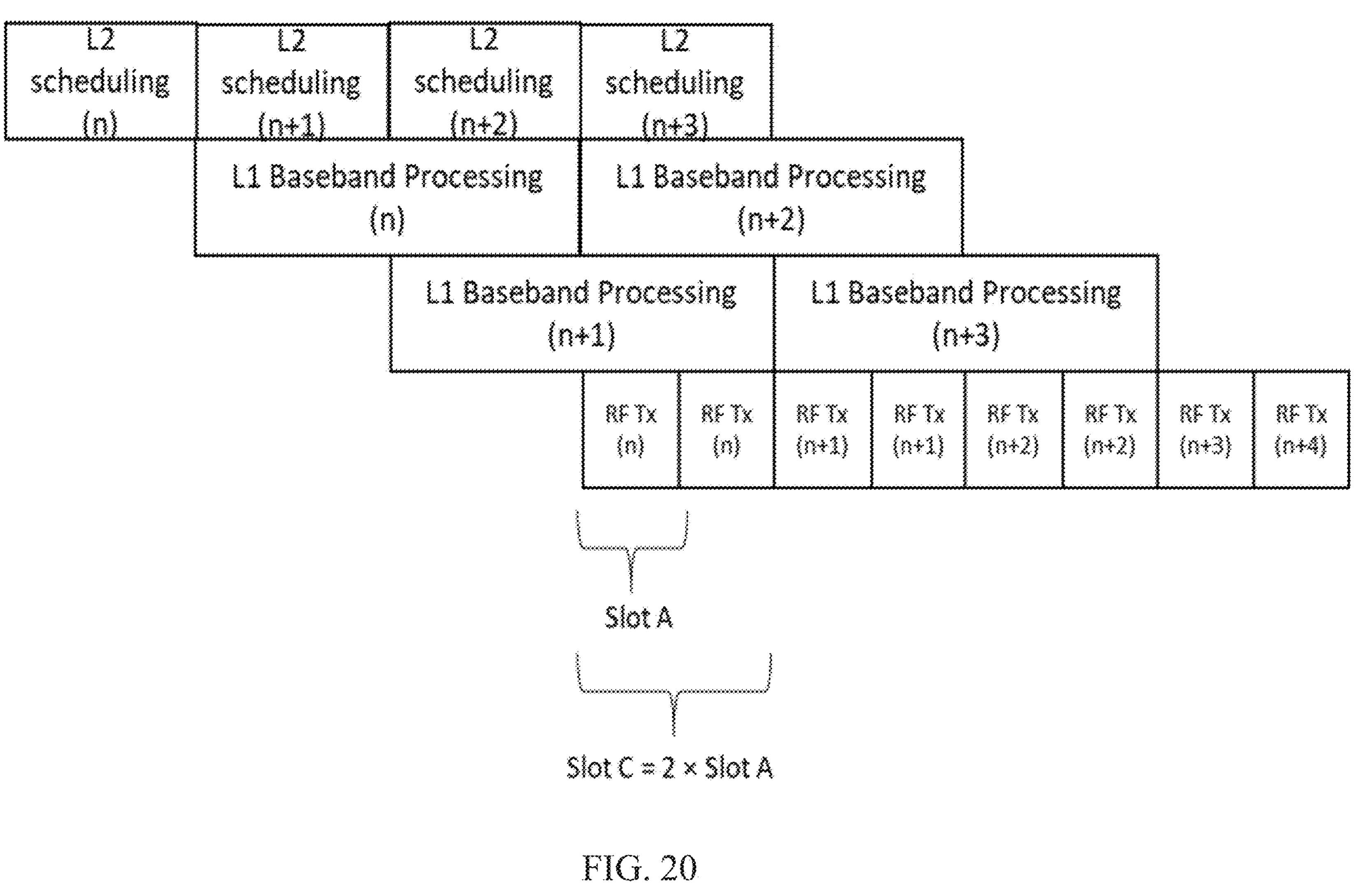
FIG. 20 illustrates another example of L2 scheduling and L1 baseband processing according to various embodiments of the present disclosure.

FIG. 20 illustrates another example of L2 scheduling and L1 baseband processing 2000 according to various embodiments of the present disclosure. An embodiment of the L2 scheduling and L1 baseband processing 2000 shown in FIG. 20 is for illustration only.

Another example is as shown in FIG. 20, where there is no parallel processing for L2 but there are two parallel processing computational cores for L1. Slot A in the figure can still be 0.125 ms for the subcarrier spacing of 120 kHz. The L2 processing and the L1 processing take 0.25 ms and 0.5 ms, respectively. In this case, the resulting PDSCH can be mapped to 2 RF transmission time slots (each with 0.125 ms) after the completion of the L1 processing. Similarly, an alternative slot definition for this multi-slot RF Tx can be defined, which is labelled Slot C (2×Slot A) in FIG. 20. In some embodiments, slot C is denoted as super-slot, and slot A is denoted as slot.

The above examples illustrate that the number of slots used for PDSCH mapping depends on the number of parallel L1/L2 processing assumed for implementation. Since the processing load is mainly due to implementation of MU-MIMO, the PDSCH of concern can be limited to UE-specific PDSCH for unicast traffic.

To allow for different implementation choices, the number of slots used for such PDSCH/PUSCH/PUCCH/PDCCH mapping (also denoted as PHY channel mapping) can be configurable by the network, and signaled to the UE. The configuration, effectively informing the number of (consecutive) slots to be assumed for PHY channel mapping, can be signaled to the UE in a broadcast control channel such as the MIB or the SIB.

In some embodiments, super-slots are used specifically for those UEs operating in a certain mode of communication, such as the MU-MIMO mode. As such, the super-slot configuration info is signaled with UE-specific (or UE-group specific) RRC configuration. Furthermore, to support dynamic switching of super-slot scheduling and single-slot PDSCH scheduling, for example to support dynamic switching of MU-MIMO and SU-MIMO operation, a UE-specific (or UE-group specific) MAC CE or DCI can be used to indicate the switching. Still, the number of slots to comprise a super slot (when enabled) is still provided in a broadcast control or in a RRC configuration message, since the dynamically changing such configuration may introduce implementation complexity.

Figure 21:
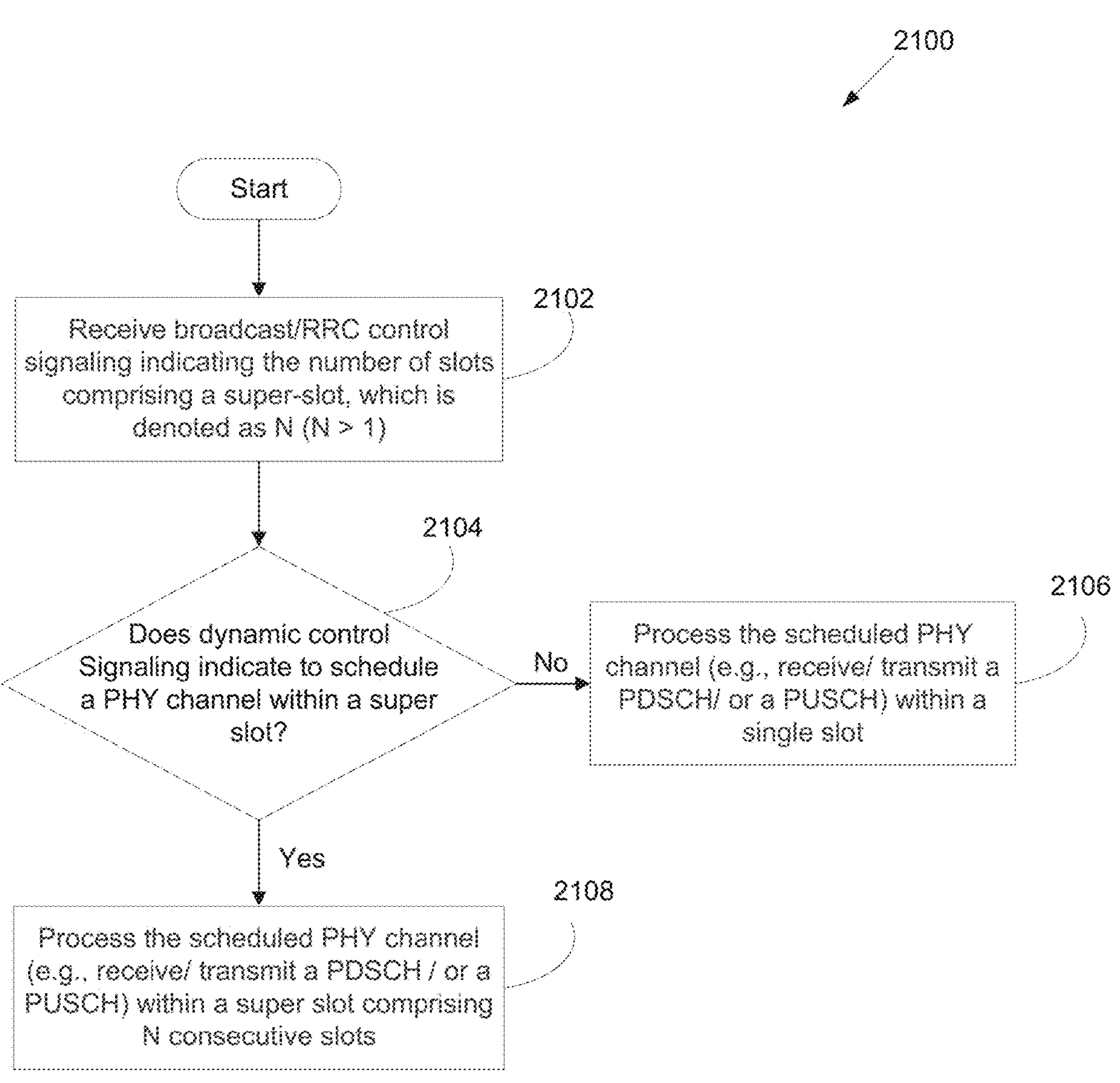
FIG. 21 illustrates a flowchart of UE method according to various embodiments of the present disclosure.

FIG. 21 illustrates a flowchart of UE method 2100 according to various embodiments of the present disclosure. The UE method 2100 as may be performed by a UE (e.g., 111-116 as illustrated in FIG. 1). An embodiment of the UE method 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions.

FIG. 21 illustrates an example UE procedure according to some embodiments of the present disclosure. UE receives broadcast/RRC control signaling indicating the number of slots comprising a super slot. A dynamic control signaling such as a DCI indicates whether the UE is scheduled with a PHY channel within a super slot or a single slot. For example, the UE receives a PDSCH within a super slot comprising N consecutive slots if a DCI indicates to use a super-slot for the reception; or the UE receives a PDSCH within one slot if a DCI indicates to use a slot for the reception.

As illustrated in FIG. 21, in step 2102, the UE receives broadcast/RRC control signaling indicating the number of slots comprising a super-slot, which is denoted as N (N>1). In step 2104, the UE determines whether dynamic control signaling indicates to schedule a PHY channel within a super slot. In step 2108, the UE processes the scheduled PHY channel within a super slot comprising N consecutive slots. In step 2110, the UE processes the scheduled PHY channel within a single slot.

Figure 22:
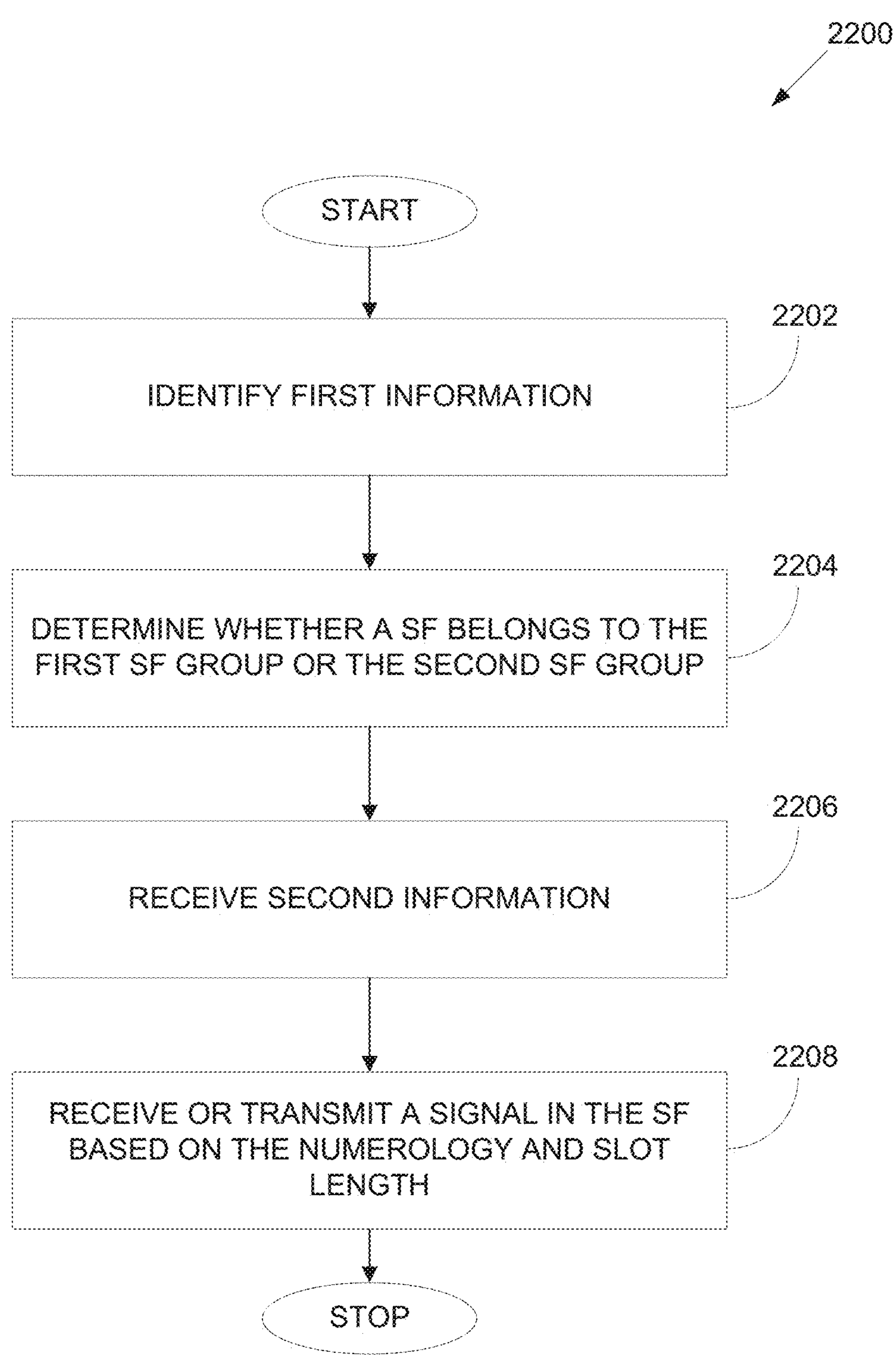
FIG. 22 illustrates a flowchart of UE method for multiple numerologies according to various embodiments of the present disclosure.

FIG. 22 illustrates a flowchart of UE method 2200 for multiple numerologies according to various embodiments of the present disclosure. The UE method 2200 as may be performed by a UE (e.g., 111-116 as illustrated in FIG. 1). An embodiment of the UE method 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions.

As illustrated in FIG. 22, the method 2200 begins at step 2202. In step 2202, a UE identifies first information associated with a set of subframe (SF) groups including a first SF group and a second SF group.

In step 2204, the UE determines, based on the first information, whether a SF belongs to the first SF group or the second SF group. In such embodiment, the set of SF groups comprise a number of slots.

In step 2206, the UE receives second information for a numerology and slot length associated with the set of SF groups.

In step 2208, the UE receives or transmits a signal in the SF based on the numerology and slot length included in the second information.

In one embodiment, the UE receives or transmits the signal in the SF based on a first numerology and a first slot length based on a determination that the SF belongs to the first SF group.

In one embodiment, the UE receives or transmits the signal the SF based on a second numerology and a second slot length based on a determination that the SF belongs to the second SF group. In such embodiment, the numerology and slot length comprises the first numerology and the first slot length and the second numerology and the second slot length.

In one embodiment, the UE identifies a slot length for the first SF group and a subcarrier spacing (SCS) commonly applicable to the first and the second SF groups.

In one embodiment, the UE determines a number of OFDM symbols per slot for the first SF group based on the slot length and the SCS.

In one embodiment, the UE receives a broadcast signaling indicating a slot length for the second SF group.

In one embodiment, the UE receives a broadcast signal indicating a value that is used to determine a slot length for the second SF group and identifies a slot length for the first SF group and a SCS applicable to the first and the second SF groups.

In one embodiment, the UE determines a number of OFDM symbols per slot for the first SF group.

In one embodiment, the UE receives a broadcast signal indicating a value that is used to determine a slot length for the second SF group.

In one embodiment, the UE determines a number of OFDM symbols per slot for the second SF group as a function of the indicated value.

In one embodiment, the UE identifies a slot length for the first SF group and a subcarrier spacing (SCS) commonly applicable to the first and the second SF groups.

In one embodiment, the UE receives at least one of the signal on overhead channels or a broadcasting signal including configuration information for numerology associated with the second SF group in SFs belonging to the first SF group. In such embodiment, the configuration information includes at least one of a number of OFDM symbols per slot, a number of subcarriers per PRB, a slot duration, a CP length, or a subcarrier spacing.

In one embodiment, the UE receives, via a MIB or a SIB, a broadcast message including configuration information for super slots; or receives a RRC message including the configuration information for the super slots. In such embodiment, the super slots comprise a number of consecutive slots including a number of OFDM symbols; the super slots are used for identifying a unit of DL and UL processing and scheduling operation for the SF belonging to the second SF group; each of the super slots is determined as a TTI; and the number of OFDM symbols included in each of the super slots is used to identify DCI content and payload for a time domain scheduling.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:

a processor configured to:

identify first information associated with a set of subframe (SF) groups including a first SF group and a second SF group, wherein the set of SF groups comprise a number of slots, determine, based on the first information, whether a SF belongs to the first SF group or the second SF group, identify a slot length for the first SF group and a subcarrier spacing (SCS) commonly applicable to the first and the second SF groups, and determine a number of orthogonal frequency division multiplexing (OFDM) symbols per slot for the first SF group based on the slot length and the SCS; and a transceiver operably coupled to the processor, the transceiver configured to:

receive second information related to a numerology and slot length associated with the set of SF groups, receive a broadcast signaling indicating a value that is used to determine a slot length for the second SF group, wherein a number of OFDM symbols per slot for the second SF group is determined as a function of the indicated value, and receive or transmit a signal in the SF based on the numerology and slot length included in the second information.

2. The UE of claim 1, wherein:

the numerology and slot length comprises a first numerology and a first slot length and a second numerology and a second slot length; and the transceiver is further configured to:

receive or transmit the signal in the SF based on the first numerology and the first slot length based on a determination that the SF belongs to the first SF group, and receive or transmit the signal in the SF based on the second numerology and the second slot length based on a determination that the SF belongs to the second SF group.

3. The UE of claim 1, wherein:

the processor is further configured to:

identify a slot length for the first SF group and a SCS commonly applicable to the first and the second SF groups, and determine a number of OFDM symbols per slot for the first SF group based on the slot length and the SCS; and the transceiver is further configured to receive a broadcast signaling indicating a slot length for the second SF group.

4. The UE of claim 1, wherein:

the processor is further configured to:

identify a slot length for the first SF group and a SCS subcarrier spacing (SCS) commonly applicable to the first and the second SF groups, and the transceiver is further configured to:

receive at least one of the signal on overhead channels or a broadcast signal including configuration information for numerology associated with the second SF group in SFs belonging to the first SF group.

5. The UE of claim 4, wherein the configuration information includes at least one of a number of OFDM symbols per slot, a number of subcarriers per physical resource block (PRB), a slot duration, a cyclic prefix (CP) length, or a subcarrier spacing.

6. The UE of claim 1, wherein:

the transceiver is further configured to:

receive, via a master information block (MIB) or a system information block (SIB), a broadcast message including configuration information for super slots, or receive a radio resource control (RRC) message including the configuration information for the super slots;

the super slots comprise a number of consecutive slots including a number of OFDM symbols;

the super slots are used for identifying a unit of downlink (DL) and uplink (UL) processing and scheduling operation for the SF belonging to the second SF group;

each of the super slots is determined as a transmission time interval (TTI); and the number of OFDM symbols included in each of the super slots is used to identify downlink control information (DCI) content and payload for a time domain scheduling.

7. A base station (BS) comprising:

a processor configured to generate second information related to a numerology and slot length associated with a set of subframe (SF) groups, wherein the set of SF groups comprise a number of slots; and a transceiver operably coupled to the processor, the transceiver configured to:

transmit the second information related to the numerology and slot length associated with the set of SF groups, transmit a broadcast signaling indicating a value that is used to determine a slot length for a second SF group, and transmit or receive a signal in a SF based on the numerology and slot length included in the second information, wherein:

first information associated with the set of SF groups including a first SF group and the second SF group is identified, whether the SF belongs to the first SF group or the second SF group is determined based on the first information, a slot length for the first SF group and a subcarrier spacing (SCS) commonly applicable to the first and the second SF groups are identified, a number of orthogonal frequency division multiplexing (OFDM) symbols per slot for the first SF group based on the slot length and the SCS are determined, and a number of OFDM symbols per slot for the second SF group is determined as a function of the indicated value.

8. The BS of claim 7, wherein:

the numerology and slot length comprises a first numerology and a first slot length and a second numerology and a second slot length; and the transceiver is further configured to:

transmit or receive the signal in the SF based on the first numerology and the first slot length based on a determination that the SF belongs to the first SF group, and transmit or receive the signal the SF based on the second numerology and the second slot length based on a determination that the SF belongs to the second SF group.

9. The BS of claim 7, wherein:

the transceiver is further configured to transmit a broadcast signaling indicating a slot length for the second SF group;

a slot length for the first SF group and a SCS commonly applicable to the first and the second SF groups are identified; and a number of OFDM symbols per slot for the first SF group is determined based on the slot length and the SCS.

10. The BS of claim 7, wherein the transceiver is further configured to receive at least one of the signal on overhead channels or a broadcast signal including configuration information for numerology associated with the second SF group in SFs belonging to the first SF group.

11. The BS of claim 10, wherein the configuration information includes at least one of a number of OFDM symbols per slot, a number of subcarriers per physical resource block (PRB), a slot duration, a cyclic prefix (CP) length, or a subcarrier spacing.

12. The BS of claim 7, wherein:

the transceiver is further configured to:

transmit, via a master information block (MIB) or a system information block (SIB), a broadcast message including configuration information for super slots, or transmit a radio resource control (RRC) message including the configuration information for the super slots;

the super slots comprise a number of consecutive slots including a number of OFDM symbols;

the super slots are used for identifying a unit of downlink (DL) and uplink (UL) processing and scheduling operation for the SF belonging to the second SF group;

each of the super slots is determined as a transmission time interval (TTI); and the number of OFDM symbols included in each of the super slots is used to identify downlink control information (DCI) content and payload for a time domain scheduling.

13. A method of a user equipment (UE), the method comprising:

identifying first information associated with a set of subframe (SF) groups including a first SF group and a second SF group, wherein the set of SF groups comprise a number of slots;

determining, based on the first information, whether a SF belongs to the first SF group or the second SF group;

identifying a slot length for the first SF group and a subcarrier spacing (SCS) commonly applicable to the first and the second SF groups;

determining a number of orthogonal frequency division multiplexing (OFDM) symbols per slot for the first SF group based on the slot length and the SCS;

receiving second information related to a numerology and slot length associated with the set of SF groups;

receive a broadcast signaling indicating a value that is used to determine a slot length for the second SF group, wherein a number of OFDM symbols per slot for the second SF group is determined as a function of the indicated value; and receiving or transmitting a signal in the SF based on the numerology and slot length included in the second information.

14. The method of claim 13, further comprising:

receiving or transmitting the signal in the SF based on a first numerology and a first slot length based on a determination that the SF belongs to the first SF group; and receiving or transmitting the signal the SF based on a second numerology and a second slot length based on a determination that the SF belongs to the second SF group, wherein the numerology and slot length comprises the first numerology and the first slot length and the second numerology and the second slot length.

15. The method of claim 13, further comprising:

identifying a slot length for the first SF group and a SCS commonly applicable to the first and the second SF groups;

determining a number of OFDM symbols per slot for the first SF group based on the slot length and the SCS; and receiving a broadcast signaling indicating a slot length for the second SF group.

16. The method of claim 13, further comprising:

identifying a slot length for the first SF group and a SCS commonly applicable to the first and the second SF groups; and receiving at least one of the signal on overhead channels or a broadcasting signal including configuration information for numerology associated with the second SF group in SFs belonging to the first SF group, wherein the configuration information includes at least one of a number of OFDM symbols per slot, a number of subcarriers per physical resource block (PRB), a slot duration, a cyclic prefix (CP) length, or a subcarrier spacing.

17. The method of claim 13, further comprising:

receiving, via a master information block (MIB) or a system information block (SIB), a broadcast message including configuration information for super slots; or receiving a radio resource control (RRC) message including the configuration information for the super slots, wherein:

the super slots comprise a number of consecutive slots including a number of OFDM symbols;

the super slots are used for identifying a unit of downlink (DL) and uplink (UL) processing and scheduling operation for the SF belonging to the second SF group;

each of the super slots is determined as a transmission time interval (TTI); and the number of OFDM symbols included in each of the super slots is used to identify downlink control information (DCI) content and payload for a time domain scheduling.

* * * * *